US012632676B1

(12) United States Patent
Smith et al.

(10) Patent No.: US 12,632,676 B1
(45) Date of Patent: May 19, 2026

(54) CONSTRAINED DIRECTIVE DETERMINATION

(71) Applicant: Amazon Technologies, Inc., Seattle, WA (US)

(72) Inventors: Andrew Michael Smith, Burien, WA (US); Michael Dillon, Bainbridge Island, WA (US); Wei Lee, San Jose, CA (US); Sharon Alpert, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 18/540,327

(22) Filed: Dec. 14, 2023

(51) Int. Cl.
*G06F 40/44* (2020.01)
*G06F 9/54* (2006.01)
*G06F 40/284* (2020.01)

(52) U.S. Cl.
CPC .............. *G06F 40/44* (2020.01); *G06F 9/547* (2013.01); *G06F 40/284* (2020.01)

(58) Field of Classification Search
CPC ......... G06F 40/44; G06F 9/547; G06F 40/284
See application file for complete search history.

(56) References Cited

U.S. PATENT DOCUMENTS

| | | | |
|---|---|---|---|
| 2024/0062019 A1* | 2/2024 | Aberle ..................... | G06F 40/40 |
| 2024/0386038 A1* | 11/2024 | Amershi ............. | G06F 16/3329 |
| 2024/0386185 A1* | 11/2024 | Munoz .................. | G06F 40/103 |

* cited by examiner

*Primary Examiner* — Daniel C Washburn
*Assistant Examiner* — Athar N Pasha
(74) *Attorney, Agent, or Firm* — Athorus, PLLC

(57) ABSTRACT

Described are systems and methods that guide an LLM in determining when to initiate a request to a user for clarification and when to cause execution of a determined directive based on an utterance. At each pass through the LLM it may be determined whether the probability score and/or confidence score of a determined token exceeds respective thresholds. Based on those determinations, the system may decide whether to proceed with the determined tokens or to request clarification.

20 Claims, 18 Drawing Sheets

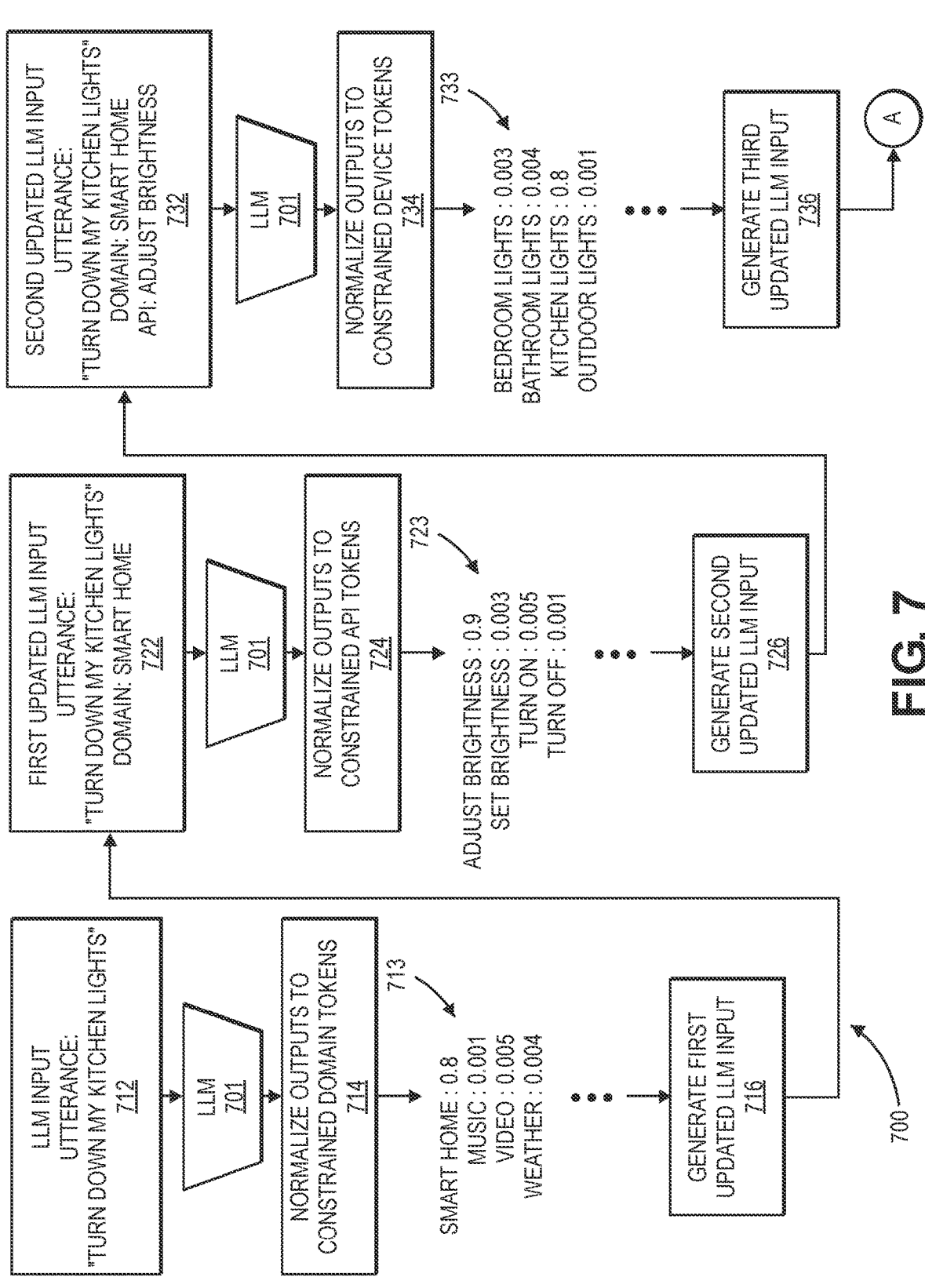

LLM INPUT
UTTERANCE:
"TURN DOWN MY KITCHEN LIGHTS"
712

LLM
701

NORMALIZE OUTPUTS TO
CONSTRAINED DOMAIN TOKENS
714

713

SMART HOME : 0.8
MUSIC : 0.001
VIDEO : 0.005
WEATHER : 0.004

GENERATE FIRST
UPDATED LLM INPUT
716

700

FIRST UPDATED LLM INPUT
UTTERANCE:
"TURN DOWN MY KITCHEN LIGHTS"
DOMAIN: SMART HOME
722

LLM
701

NORMALIZE OUTPUTS TO
CONSTRAINED API TOKENS
724

723

ADJUST BRIGHTNESS : 0.9
SET BRIGHTNESS : 0.003
TURN ON : 0.005
TURN OFF : 0.001

GENERATE SECOND
UPDATED LLM INPUT
726

SECOND UPDATED LLM INPUT
UTTERANCE:
"TURN DOWN MY KITCHEN LIGHTS"
DOMAIN: SMART HOME
API: ADJUST BRIGHTNESS
732

LLM
701

NORMALIZE OUTPUTS TO
CONSTRAINED DEVICE TOKENS
734

733

BEDROOM LIGHTS : 0.003
BATHROOM LIGHTS : 0.004
KITCHEN LIGHTS : 0.8
OUTDOOR LIGHTS : 0.001

GENERATE THIRD
UPDATED LLM INPUT
736

CONSTRAINED DIRECTIVE DETERMINATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems, also referred to herein as domains, to perform actions in response to natural language inputs (e.g., spoken inputs and/or typed inputs), also referred to herein as utterances. Thus, a system may receive a natural language input, process the natural language input to determine an action to be performed that is responsive to the natural language input, and invoke a skill system to perform the action. For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

The disclosed implementations describe systems and methods to guide an LLM in determining when to initiate a request to a user for clarification and when to cause execution of a determined directive based on an utterance. As discussed further below, at each pass through the LLM it may be determined whether the probability score and/or confidence score of a determined token exceeds respective thresholds. Based on those determinations, the system may decide whether to proceed with the determined tokens or to request clarification.

Figure 1:
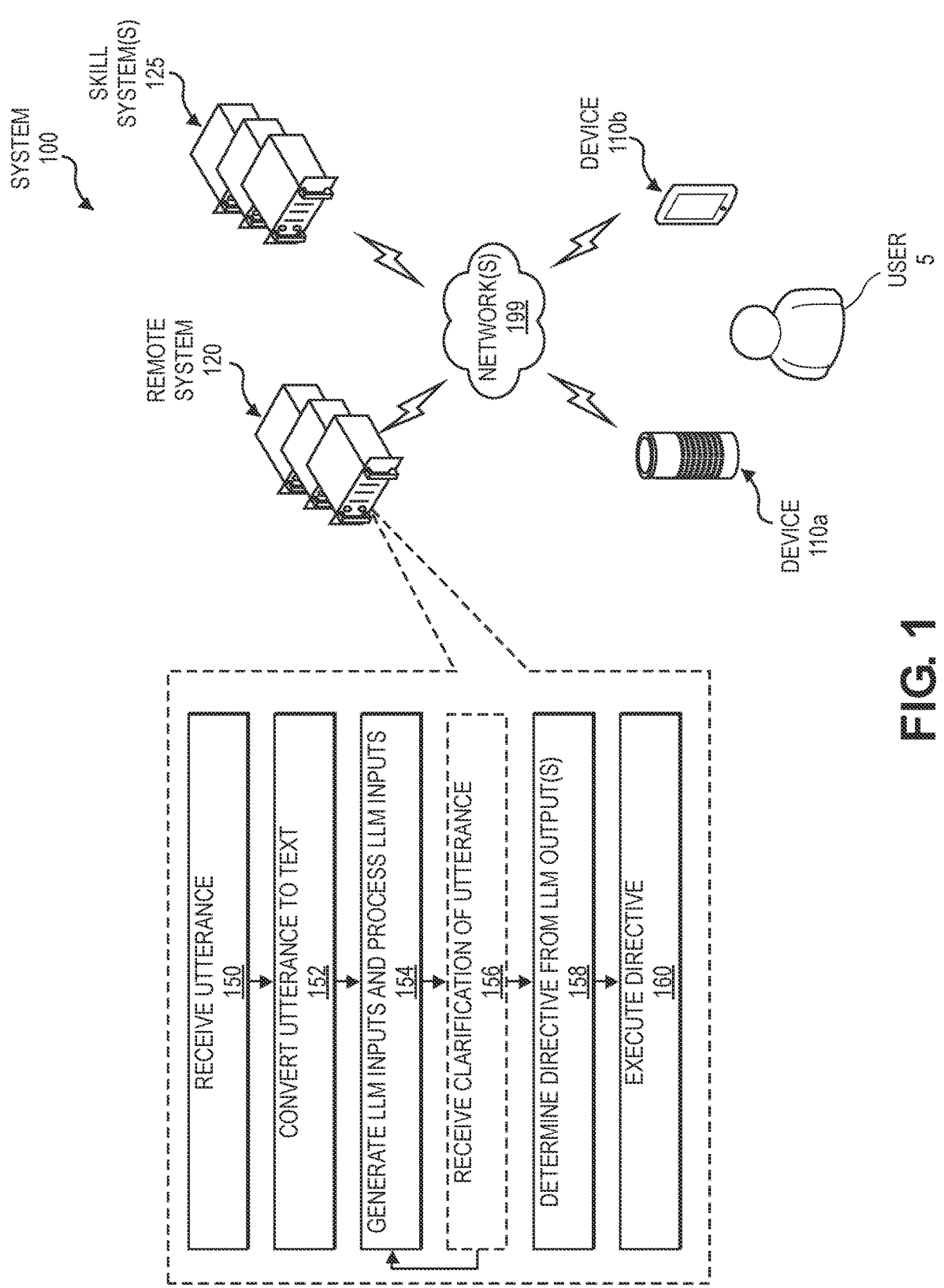
FIG. 1 is a conceptual diagram illustrating an example system configured to provide constrained directive determination and execution, in accordance with disclosed implementations.

FIG. 1 illustrates an example of a system 100 configured to provide constrained directive determination and execution, in accordance with implementations of the present disclosure.

As shown in FIG. 1, the system 100 may include one or more devices (110a/110b) local to a user 5, a remote system 120, and one or more skill system(s) 125. As illustrated in FIG. 1, the one or more devices (110a/110b), the remote system 120, and the skill system(s) 125 may communicate across one or more networks 199. While the user 5 is illustrated as being a human, other types of users (e.g., computing systems) may exist.

FIG. 1 includes a process flow illustrating how directives may be determined from an utterance and used to perform one or more actions through the skill system 125. As described in greater detail below with regard to FIG. 2, the remote system 120 may be configured to perform automatic speech recognition ("ASR") to process an utterance received from a user 5 into a written form (speech-to-text), generate a Large Language Model ("LLM") input based on the written form, determine if clarification is needed, and determine one or more directives or actions to be performed based on one or more outputs received from the LLM in response to the LLM input(s). For example, the remote system 120 may process audio data received from the first device 110a to determine an action to perform that is responsive to a voice command represented in the audio data. However, the disclosure is not limited thereto and the remote system 120 may receive input commands using any techniques known to one of skill in the art.

In some examples, the remote system 120 may perform an action by interacting with the one or more skill system(s) 125. For example, each of the one or more skill system(s) 125 may be associated with specific functionality, such that the remote system 120 may identify a first skill system corresponding to the action and may send a directive to the first skill system to perform the action. The one or more skill system(s) 125 may perform any functionality known to one of skill in the art without departing from the disclosure.

As illustrated in FIG. 1, a skill system 125, such as a smart home skill system, may be configured to interact with one or more devices 110 associated with a user profile. For example, a smart home skill system may enable the user 5 to turn on and off smart light switches, smart plugs, and/or the like, to receive temperature information and/or control a thermostat, to monitor security cameras and/or receive event data corresponding to a security system (e.g., data from components of a security system such as cameras, door/ window sensors, etc. that are connected to a security system configured to operate with components discussed herein), to receive sensor data and/or event data from a plurality of sensors, and/or the like. Thus, the user 5 may control a smart home environment using the smart home skill system(s) 125a using techniques known to one of skill in the art. In some examples, the smart home skill system(s) 125a may monitor device state information for each of the plurality of devices associated with the user profile.

Some of the other skill system(s) 125 may be configured to perform additional functionality. For example, some of the skill system(s) 125 may be configured to play games or provide other entertainment for the user 5. Still further, different skill system(s) 125 may perform similar or different functionality. For example, a security skill system may monitor event data using techniques described below with regard to other skill systems, such as a smart home skill system without departing from the disclosure. Thus, the skill system(s) 125 are depicted as conceptual illustrations, but the disclosure is not limited thereto.

At some point, the device 110a may receive audio (utterance) corresponding to a spoken natural language input originating from the user 5, as in 150. The device 110a may generate audio data corresponding to the audio and may send the audio data to the remote system 120. Alternatively, the device 110b may receive a typed natural language input from the user 5. The device 110b may generate text data corresponding to the typed input and may send the text data to the remote system 120.

The device 110a may send the audio data and/or the text data to the remote system 120 via a first application that is installed on the device 110a and associated with the remote system 120. An example of such an application is the Amazon Alexa application that may be installed on a smart phone, tablet, or the like.

As illustrated in FIG. 1, the remote system 120 may receive (150) an utterance from a user 5 that is recorded as audio data by a device 110a. The remote system 120 may process the utterance using ASR to convert the utterance to text (152). ASR is known in the art and need not be discussed further herein.

The remote system 120, as discussed further below, may also determine all possible domains/skill systems 125, APIs, devices, and/or actions that may possibly be utilized to perform a directive determined from the utterance. For example, the remote system may determine the location of the user, devices associated with the location and/or the user, API calls that may be used for those devices, and/or actions that may be performed by those devices. Based on the text generated from the utterance, and the determined domains, APIs, devices, and/or actions, an LLM input may be generated (154) and processed by an LLM to determine the directive to be executed. As discussed further below, the LLM may be constrained to only consider the possible domains, APIs, devices, and/or actions when determining the directive. Still further, in some implementations, it may be determined that clarification (156) is to be obtained from the user that generated the utterance and the clarification may be used to update the LLM input so that the correct directive can be generated and executed.

Based on the output(s) generated by the LLM in response to the LLM input(s), a directive that indicates, for example, a domain (e.g., SMARTHOME, MUSIC, VIDEO, CHAT-BOT, etc.), an API call (e.g., ADJUSTBRIGHTNESS, SET-BRIGHTNESS, TURNON, TURNOFF, etc.), a device identifier, and an action may be determined (158) and sent to the appropriate skill system 125 for execution (160).

In some examples, the remote system 120 may send the generated directive to the determined skill system 125 for execution. For example, a smart home skill system 125 may receive a directive to perform a first action (e.g., turn on the kitchen lights) and may perform the first action, for example, by sending an instruction to a device 110a/110b that causes the kitchen lights to turn on. In other examples, if the remote system 120 already knows the sensor(s)/device(s) 110 that is to perform the action, or does not need to know which sensor(s) and/or device(s) 110 that is to perform the action, the remote system 120 may send the directive to the sensor/ device without sending the directive to skill system 125.

Figure 2:
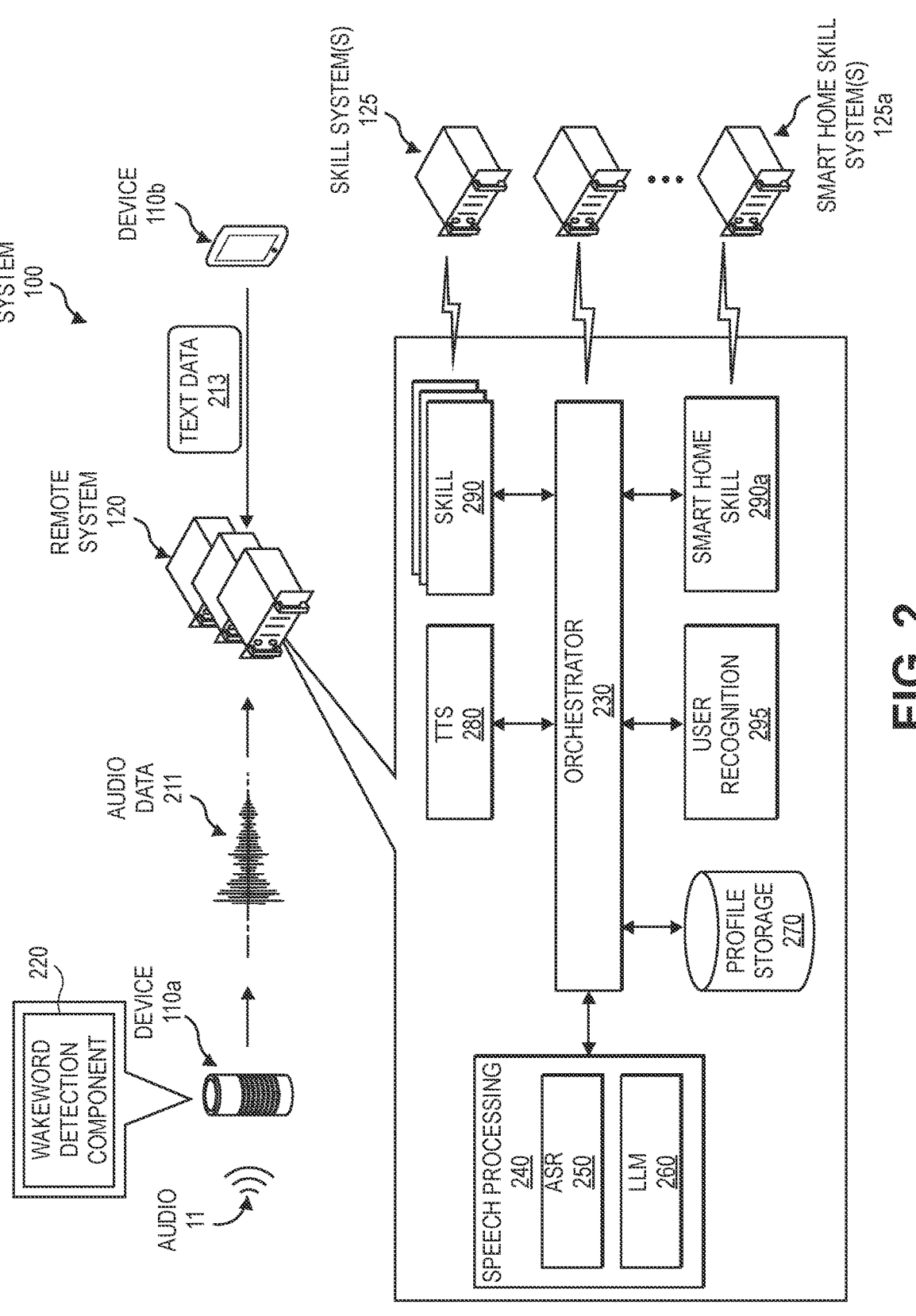
FIG. 2 is a conceptual diagram of components of the example system illustrated in FIG. 1, in accordance with implementations of the present disclosure.

The system 100 may operate using various components as described in FIG. 2. The various components may be located on a same or different physical devices. Communication between various components may occur directly or across a network(s) 199.

FIG. 2 is a conceptual diagram of components of the example system illustrated in FIG. 1, in accordance with implementations of the present disclosure.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection ("VAD") techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the remote system 120. The device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The remote system 120 may include an orchestrator component 230 configured to receive the audio data 211 (and optionally an assistant identifier) from the device 110a. The orchestrator component 230 may send the audio data 211 to a speech processing component 240. In some examples, the speech processing component 240 may include an ASR component 250 that is configured to process the audio data 211 to generate text that is provided to an LLM 260. However, the disclosure is not limited thereto and in other examples, the speech processing component 240 may include a spoken language understanding (SLU) component that is configured to process the audio data 211 to generate the text data. Other forms of audio to text may also be utilized with the disclosed implementations.

The ASR component 250 transcribes the audio data 211 into ASR results data (e.g., text data) that includes one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

As discussed further below, one or more of the ASR hypotheses may be included in an LLM input that is provided to the LLM 260. The LLM may process the LLM input, and constrained tokens, to determine one or more directives or commands to be performed by one or more devices.

The device 110b may receive a typed natural language input. The device 110b may generate text data 213 representing the typed natural language input. The device 110b may send the text data 213 to the remote system 120, wherein the text data 213 is received by the orchestrator component 230. The orchestrator component 230 may send text data (e.g., text data output by the ASR component 250 or the received text data (213) to the LLM 260).

The LLM component 260 may also track a dialog and dialog state across multiple utterances and/or multiple inputs to the LLM. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a command that could be performed by different devices and the system may need to ask the user for one or more clarifications before the command is executed. For example, if the user speaks the command "turn on the bedroom lights" and there are three bedrooms, the system may ask one or more clarifying questions to determine which bedroom and which corresponding bedroom lights to turn on. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The LLM component 260 attempts to make a semantic interpretation of the phrase(s) or statement(s) represented in the received text data 213. That is, the LLM component 260 determines one or more meanings associated with the phrase(s) or statement(s) represented in the text data 213 based on words represented in the text data. The LLM component 260 determines an action that a user desires to be performed as well as pieces of the text data 213 that allow a device (e.g., the device (110a/110b), the remote system 120, a skill system 125, etc.) to execute the action. For example, if the text data 213 corresponds to "play Adele music," the LLM component 260 may determine a <Play-Music> action and may identify "Adele" as an artist. For further example, if the text data 213 corresponds to "what is the weather," the LLM component 260 may determine an <Output Weather> action. In another example, if the text data 213 corresponds to "turn off the lights," the LLM component 260 may determine a <DeactivateLight> action.

The LLM component 260 may ultimately output LLM results data (which may include tagged text data, indicators of actions, etc.) to the orchestrator component 230. The LLM results may include an LLM hypothesis, including a representation of an action and corresponding slotted data that may be used by a downstream component to perform the action. Alternatively, the LLM results data may include multiple LLM hypotheses, with each LLM hypothesis representing an action and corresponding slotted data. Each LLM hypothesis may be associated with a confidence value representing a confidence of the LLM component 260 in the processing performed to generate the LLM hypothesis associated with the confidence value.

The orchestrator component 230 may send the LLM results to an associated skill component 290. If the LLM results include multiple LLM hypotheses, the orchestrator component 230 may send a portion of the LLM results corresponding to the top scoring LLM hypothesis to a skill component 290 associated with the top scoring LLM hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or skill system(s) 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill system(s) 125. The skill system(s) 125 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill system(s) 125 may provide output text data responsive to the present user command.

The remote system 120 may communicate with one or more skill systems 125. A skill system 125 may be configured to execute with respect to LLM results data. For example, for LLM results data including a <GetWeather> action, a weather skill system may determine weather information for a geographic location represented in a user profile or corresponding to a location of the device 110 that captured a corresponding natural language input. For further example, for LLM results data including a <BookRide> action, a taxi skill system may book a requested ride. In another example, for LLM results data including a <BuyPizza> action, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

As illustrated in FIG. 2, the system 100 may include a smart home skill 290*a* that is associated with a smart home skill system(s) 125*a*. For ease of explanation, the following description may refer to the smart home skill 290*a* and/or the smart home skill system(s) 125*a* interchangeably to describe specific functionality. However, the smart home skill 290*a* is associated with the remote system 120 and therefore involves natural language processing performed by the remote system 120, whereas the smart home skill system(s) 125*a* may be configured to perform actions using any interface, including a graphical interface with a user device 110 (e.g., smart phone).

The smart home skill system(s) 125*a* may be configured to receive event data from the devices 110 and track the event data. For example, a first device 110 may generate event data using sensor data generated by sensor(s) associated with the first device 110 and may send the event data to the smart home skill system(s) 125*a*. The event data may correspond to a variety of different types of events, and the smart home skill system(s) 125*a* may store/manage the event data to keep track of the state of all of the devices 110 and/or events detected by the devices 110. The smart home skill system(s) 125*a* may provide the event data, or a subset of the event data, to other components that have permission to access the event data without departing from the disclosure.

The remote system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition (e.g., user recognition processing) by comparing speech characteristics, in the audio data 211, to stored speech characteristics of users. The user recognition component 295 may additionally or alternatively perform user recognition by comparing biometric data (e.g., fingerprint data, iris data, etc.), received by the remote system 120 in correlation with a natural language input, to stored biometric data of users. The user recognition component 295 may additionally or alternatively perform user recognition by comparing image data (e.g., including a representation of at least a feature of a user), received by the remote system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform LLM processing, processing performed by a skill system 125, as well as processing performed by other components of the remote system 120 and/or other systems.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

In some implementations, the LLM component 260 may be a decoder only LLM. Decoder only LLMs only allow information to flow forward in time, and each forward pass through the LLM results in a single token. Generally described, selection of a token at each pass through the LLM includes generation of a conditional distribution over all tokens given a prompt and a text generation algorithm that selects a token based on the conditional distribution.

As is known in the art, for text generation with an LLM, a forward pass through the LLM is required for each token. As such the latency in generating text depends directly on the number of tokens the LLM must output to complete a response. Still further, in some LLMs, tokens may be sub-word tokens, such that multiple tokens are required to produce a single word of an output response.

While such sub-word token generation and the inherent latency works fine for most LLM inputs, as discussed further herein, to improve processing of an utterance by an LLM to generate a structured output in the form of a directive, the disclosed implementations utilize a set of tokens and constrain the LLM output based on possible tokens for each pass through the LLM in generating the LLM output. For example, and as discussed further below, because there is only a defined list of possible tokens that may be used to generate different parts of the directive, with each pass through the LLM, the selected token may be utilized to determine all possible tokens that are to be used to constrain the LLM output for the next pass through the LLM. For example, if the LLM output of the first pass through the LLM is determined to be the token "Action," it is known that the LLM is going to generate an API call, which has a defined structure. For example, in some implementations, when the first token is "Action," the LLM may be instructed to generate a directive with the following output structure: Action: <DOMAIN>.<API_NAME> (IDs=[<DEV1>, <DEV2>, . . . ], arg=value, . . . ). In such a defined output structure, available devices, etc., there is a definitive list of tokens that may be generated for each element of <DOMAIN>, <API_NAME>, IDs, <DEV1>, <DEV2>, value, etc. By generating tokens, tuning the LLM with those tokens, and then constraining the LLM output at each pass through the LLM to only a defined set of tokens, generation of the directive is performed with more efficiency and accuracy than traditional systems. For example, by constraining the LLM output at each pass to only tokens that correspond to a selected token from a previous pass, the accuracy is increased because the output will be constrained to only include tokens that are related to other aspects of the directive that have been selected for inclusion in a structured output. Still further, at each pass through the LLM it may be determined whether the confidence score for a token exceeds a threshold and the LLM can continue or if clarification is needed from the user to generate the LLM output as a directive.

While the discussion herein primarily focuses on generation of a directive from an LLM input, the disclosed implementations may be utilized with any structure in which a defined output with a definitive list of words/tokens is to be generated.

Figure 3:
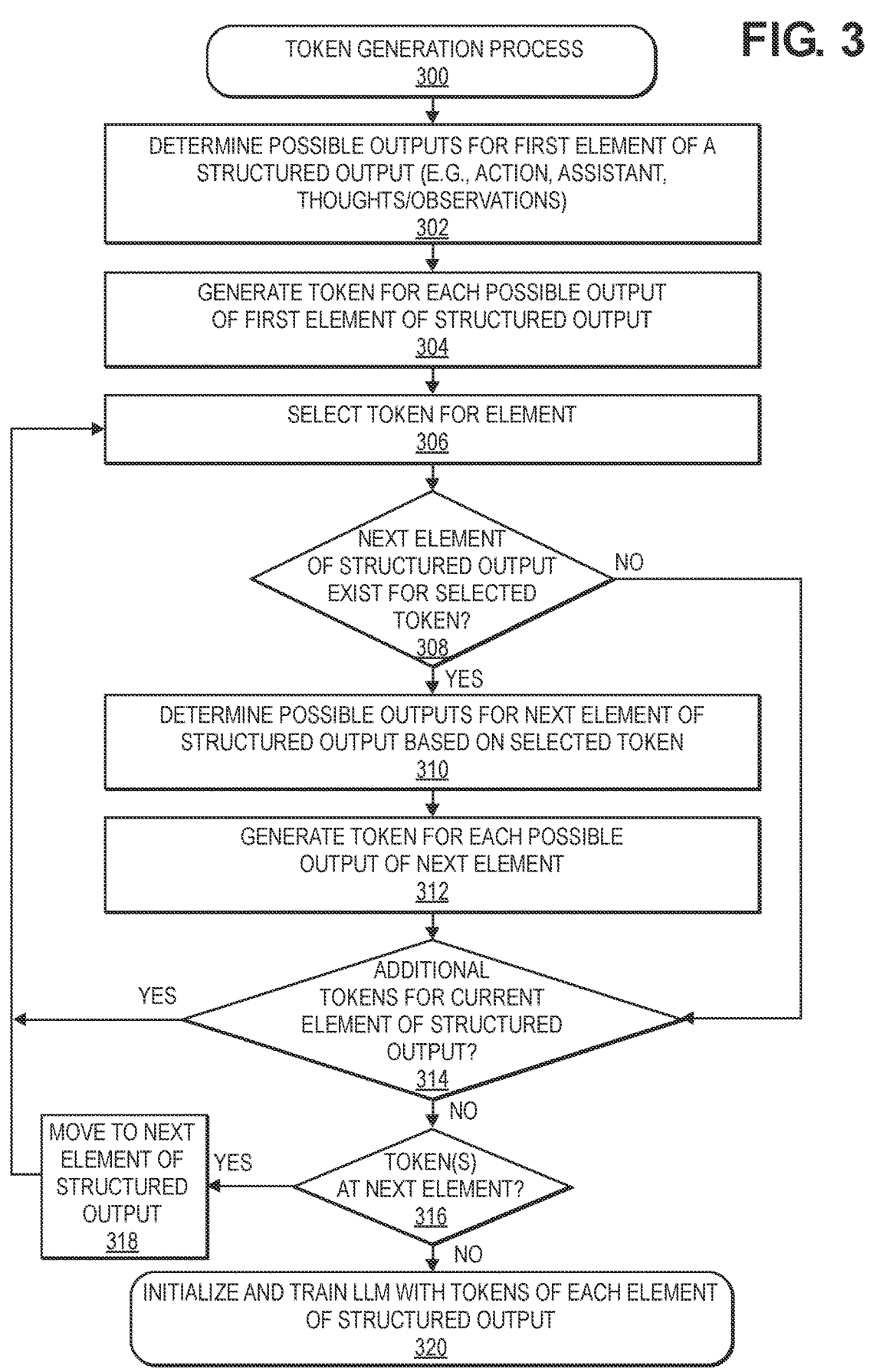
FIG. 3 is an example token generation process, in accordance with implementations of the present disclosure.

FIG. 3 is an example token generation process 300, in accordance with implementations of the present disclosure.

The example process 300 begins by determining all possible outputs that may be generated for a first element of a defined output structure to which the LLM is to conform outputs, as in 302. For example, if the LLM may be used to correspond with a user, generate lists, perform actions in response to user commands, etc., possible outputs for a first element of a defined output structure may be ACTION, ASSISTANT, and THOUGHTS/OBSERVATIONS. As will be appreciated, traditional decoder only LLMs may require multiple passes through the LLM to generate these outputs. For example, the sub-word tokens for CONVERSATION may be, for example, "CON" "VER," "SA", and "TION." In such an example, a traditional decoder only LLM would require four passes through the LLM to generate the first element output of CONVERSATION.

Rather than utilize the existing sub-word token structure of a decoder only LLM, a token may be generated for each possible first element of a structured output, as in 304. In this example, tokens of ACTION, ASSISTANT, and THOUGHTS/OBSERVATIONS may be created as possible first element tokens of a structured output.

After generating each of the possible first element output tokens, a token for the first element of the structured output is selected, as in 306, and a determination is made as to whether there is a possible next element of the structured output that exists when the token for that element is selected, as in 308. For example, if the token "ACTION" is selected for the first element of the structured output, which may indicate that a DOMAIN is to be generated, a defined structured output exists for the token and it may be determined if there is a next element in the structured output following the current element for which a token is to be generated.

If it is determined that there are outputs for a next element in the structured output and based on the selected token, all possible outputs for the next element are determined, as in 310. For example, if the selected token is "ACTION," it can be determined that the next output to be included in the defined output structure is a domain. For example, the domain may be any one of SMART HOME, MUSIC, CHATBOT, or other skill. The example process 300 may then generate a token representative of each possible output for that next element of the structured output, as in 312.

After generating tokens for all possible outputs that may be included in a structured output based on the selected token of the element, or if it is determined at decision block 308 that there is no possible outputs for a next element of a structured output based on the selected token of the element, a determination is made as to whether additional tokens for that element remain that are to be processed by the example process 300, as in 314. If it is determined that additional tokens for that element remain to be processed, the example process 300 returns to block 306, selects a next token of the element and continues.

If it is determined that no additional tokens remain to be processed for the element of the structured output, a determination is made as to whether tokens exist for a next element of the structured output, as in 316. If it is determined that tokens exist for the next element of the structured output, the example process 300 moves to the next element of the structured output, as in 318, selects a token of the element, as in 306, and continues. If it is determined at decision block 316 that no tokens exist at the next element of the structured output (i.e., all elements of the structured output have been processed), the LLM is tuned with the tokens for each element of the structured output, as in 320.

Figure 4:
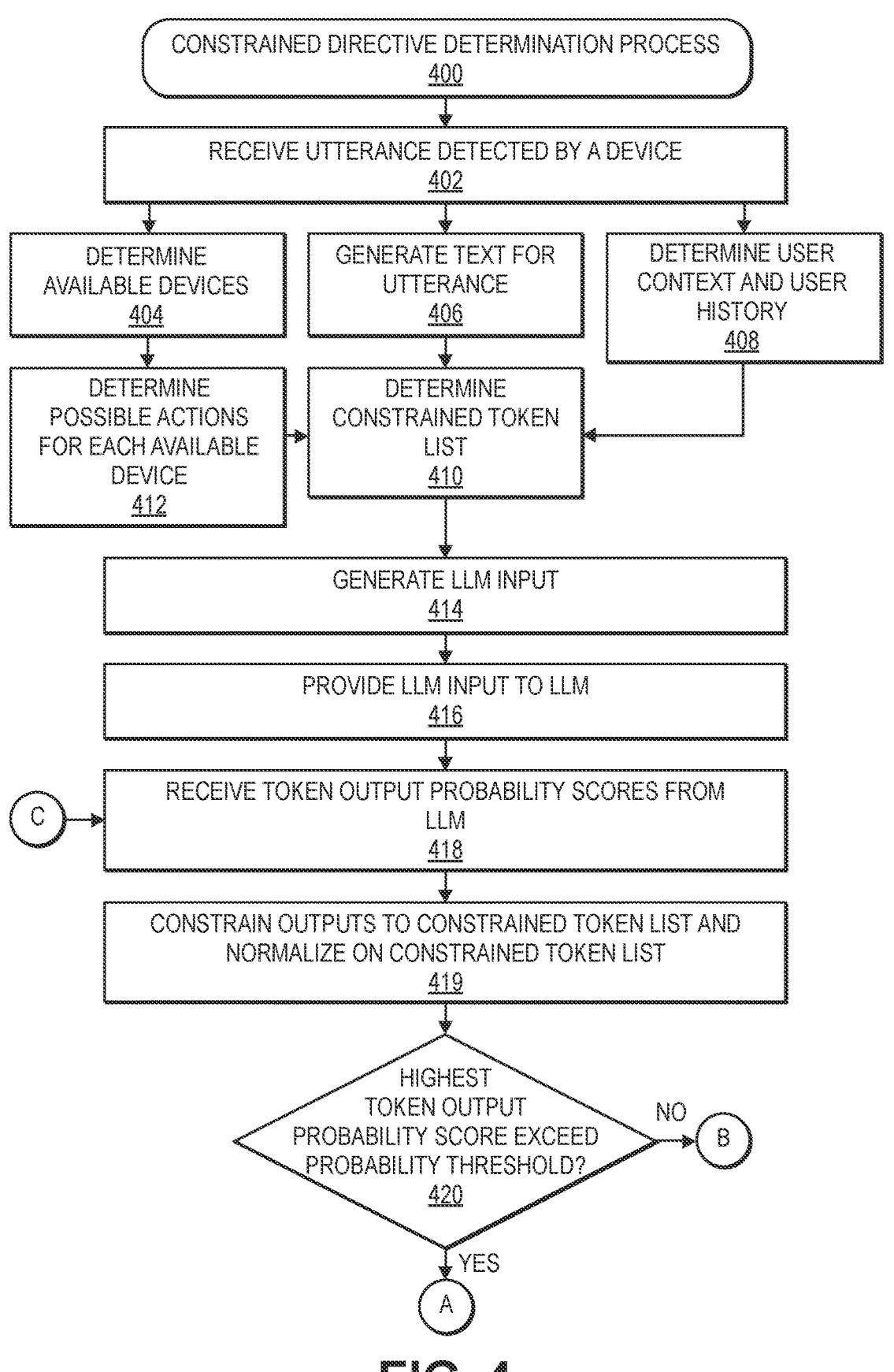
FIG. 4 is an example constrained directive determination process, in accordance with implementations of the present disclosure.
Figure 4:
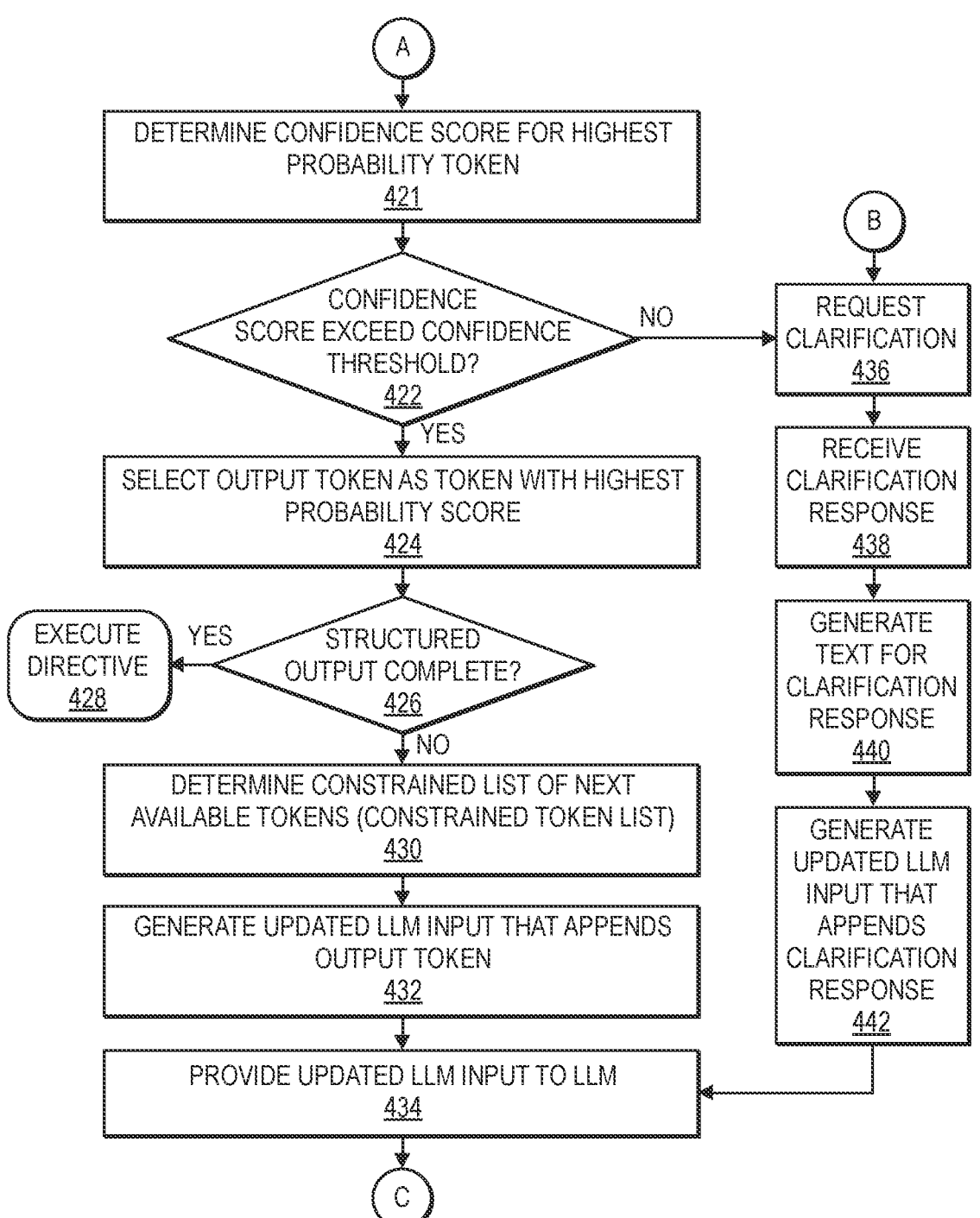

FIG. 4 is an example constrained directive determination process 400, in accordance with implementations of the present disclosure. The example process may be utilized with each pass through the LLM to constrain the LLM to consider only a constrained list of tokens for each pass through the LLM.

The example process 400 begins upon receipt of an utterance detected by a device, as in 402, and as discussed above. Upon receipt of an utterance, the example process may determine available devices that may be used to perform a directive determined from the utterance, as in 404. For example, as discussed above, a user that generated the utterance may be determined and only devices associated with or authorized for use by that user may be identified. In another example, the device that recorded the utterance may be determined and only devices that are connected to or located with the device that received the utterance may be determined. As one example, if the device that received the utterance is a device in a user's home, all devices in the user's home that are known and capable of responding to a command or directive may be determined. Likewise, in some implementations, possible actions that may be performed or executed by each of the determined devices may also be determined, as in 412.

In addition to determining devices and actions that may be used to perform one or more directives determined from the utterance, the utterance may be converted to text, for example using ASR or other speech-to-text technique, as discussed above, as in 406. Likewise, a user context and user history may be determined for the user that generated the utterance, as in 408. User context and/or user history may include, but is not limited to, prior commands or directives generated for the user in response to user utterances, user preferences, user usage history, etc.

Based on the list of possible devices, possible actions that may be performed by those devices, the generated text, and the user context and user history, a constrained token list may be generated, as in 410. For example, the constrained token list may indicate all domain tokens, such as SMART HOME, MUSIC, CHATBOT, or other skill that is associated with the user or the devices associated with the user.

An LLM input may then be generated that includes instructions for the LLM, as in 414. The LLM input may include, for example, instructions for the LLM, the available devices, and the actions supported by each device type. An example LLM input may look like the following:

System: You are a chat assistant ("Assistant") conversing with a human ("Human"). Follow this dialog structure to have an engaging and helpful conversation:

Assistant: #respond to "Human" using available information

Action: #request additional information or perform actions requested by Human

Context: Human has the following devices:

device Id is deviceID01, its name is "plug 1", its appliance type is smartplug, its supported actions are getConnectivity, getPower, turnoff and turnOn device ID is deviceID02, its name is "music", its appliance type is application, its supported actions are getPlaybackState, playbackFastForward, playbackNext, playbackPause, playbackPlay, playbackPrevious, playbackRewind, playbackStartOver and playbackStop device ID is deviceID03, its name is "light 1", its appliance type is light, its supported actions are adjustBrightness, decreaseColorTemperature, getBrightness, getColor, getColorTemperature, getPower, increaseColorTemperature, setBrightness, setColor, setColorTemperature, and turnOn device ID is deviceID04, its name is "video 1", its appliance type is application, its supported actions are getPlaybackState, playbackFastForward, playbackNext, playbackPause, playbackPlay, playbackPrevious, playbackRewind, playbackStartOver and playbackStop device ID is deviceID05, its name is "tv", its appliance type is tv, and its media input can be set to one of [HDMI one (Karaoke System), HDMI two (VCR), AUX one (DVD)], its supported actions are changeChannel, getChannel, getInput, getPlaybackState, getPower, playbackFastForward, playbackNext, playbackPause, playbackPlay, playbackPrevious, playbackRewind, playbackStartOver, playbackStop, selectInput, skipChannels, turnoff and turnOn Human: turn on the bedroom lights The generated LLM input may then be provided to an LLM tuned with the tokens, as discussed above with respect to FIG. 3, as in 416.

The LLM, for each pass through the LLM, generates and outputs probability scores for each of a plurality of tokens, including the tokens generated by the example process 300 (FIG. 3), indicating a probability that the token corresponds to the element for which the tokens are processed, as in 418. The output from the LLM may then be constrained to just the tokens indicated on the constrained token list and the probability scores for those tokens re-normalized across the tokens indicated on the constrained token list to generate a probability distribution based on just the constrained tokens, as in 419. For example, the LLM may output probability scores for thousands of tokens, including the tokens upon which it was tuned (FIG. 3). If the determined constrained token list includes four tokens, the LLM output will be constrained to those four tokens and the probability scores for those four tokens re-normalized with respect to those four tokens. A determination may then be made as to whether the highest probability score determined for a token of the constrained token list, once re-normalized, exceeds a probability threshold, as in 420. The probability threshold may be any value and may be different for different users, different actions, different domains, different devices, etc.

If it is determined that the highest re-normalized probability score, or at least one of the re-normalized probability scores, exceeds the probability threshold, in some implementations, a confidence score may be determined for the token with the highest probability score, the confidence score indicating a confidence that the token with the highest probability score is the correct token, as in 421. The confidence score may be determined based on the highest probability score and/or based on probability scores determined for the other tokens of the constrained token list. For example, if the LLM output is constrained to five tokens and the determined probability scores for those five tokens are re-normalized to 0.75, 0.15, 0.05, 0.03, 0.02, a high confidence score may be associated with the token having the highest probability score because it is much more likely, in this example, that the token with the highest probability score is the correct token. Likewise, low probability scores may be assigned to the other tokens indicating that there is a low confidence that one of those tokens is the correct token. In comparison, if the probability scores were re-normalized to 0.55, 0.25, 0.15, 0.03, and 0.02, the token corresponding to the highest probability score may receive a low confidence score because there is a high probability that more than one of the tokens of the constrained token list is the correct token. Likewise, in some implementations, some or all of the other tokens may also receive low confidence scores because there is a low confidence that any of those tokens are the correct token.

A determination may then be made as to whether the confidence score for the token with the highest probability score exceeds a confidence threshold, as in 422. Like the probability threshold, the confidence threshold may be any value and may be different for different users, different actions, different domains, different devices, etc. If it is determined that the confidence score for the token with the highest probability score exceeds the confidence threshold, the token with the highest probability score is selected as the output token for that pass through the LLM and the token added to the structured output to be generated by the LLM, as in 424.

A determination may then be made as to whether the structured output that is to be generated by the LLM is complete, as in 426. If it is determined that the structured output is complete, the output is sent by the example process 400 for execution, as in 428.

If it is determined that the structured output is not complete, a constrained list of next available tokens for the LLM to consider is determined, referred to herein as a constrained token list, as in 430. As noted above, upon selection of a token for each element of the structured output that is to be generated by the LLM, there is a definitive list of tokens that may be considered for the next element. Namely, only tokens of the next element that are related to the token selected for the current element of the structured output may be possible tokens for selection in the next element of the structured output. As such, those tokens may be used to constrain the output generated by the LLM in the next pass through the LLM.

The LLM input may then be updated to append the token selected for that element of the structured output, as in 432.

The updated LLM input may then be provided to the LLM for processing again through the LLM in a next pass, as in 434.

Returning to decision block 422, if it is determined that the confidence score determined for the token with the highest probability score does not exceed the confidence threshold, or if it is determined at decision block 420 that the highest probability score does not exceed the probability threshold, a request for clarification may be generated and sent to the user that produced the utterance, as in 436. In some implementations, the request for clarification may be generated and sent by the LLM. In other implementations, the LLM may provide the tokens and probability scores to a separate service and the separate service may generate the request for clarification. In some implementations, the request for clarification may indicate the token (e.g., device, activity, etc.) with the highest probability score along with a request that the user confirm that is the intent of the utterance. In other examples, the request for clarification may indicate two or more tokens and request clarification as to the intent of the user. In still other examples, the request for clarification may include any number of tokens (or a defined number of tokens) with probability scores that exceed the probability threshold. As another example, a defined number of the constrained tokens with the highest confidence scores may be included in the request for clarification. The request for clarification may then be presented to the user that generated the utterance. For example, the device that recorded the utterance may generate an output (visual, audible, haptic) that includes the request for clarification and the user may provide the clarification to the device, or another device.

Upon receiving a clarification response, as in 438, such as another utterance from the user, the clarification response is processed to generate a textual representation of the clarification response, as in 440. An updated LLM input may then be generated that appends the clarification response to the LLM input, as in 442. The example process 400 may then proceed to block 434 and provide the updated LLM input to the LLM. Because the LLM may maintain state information/session history, it can continue processing the LLM input with the updated information.

Figure 5:
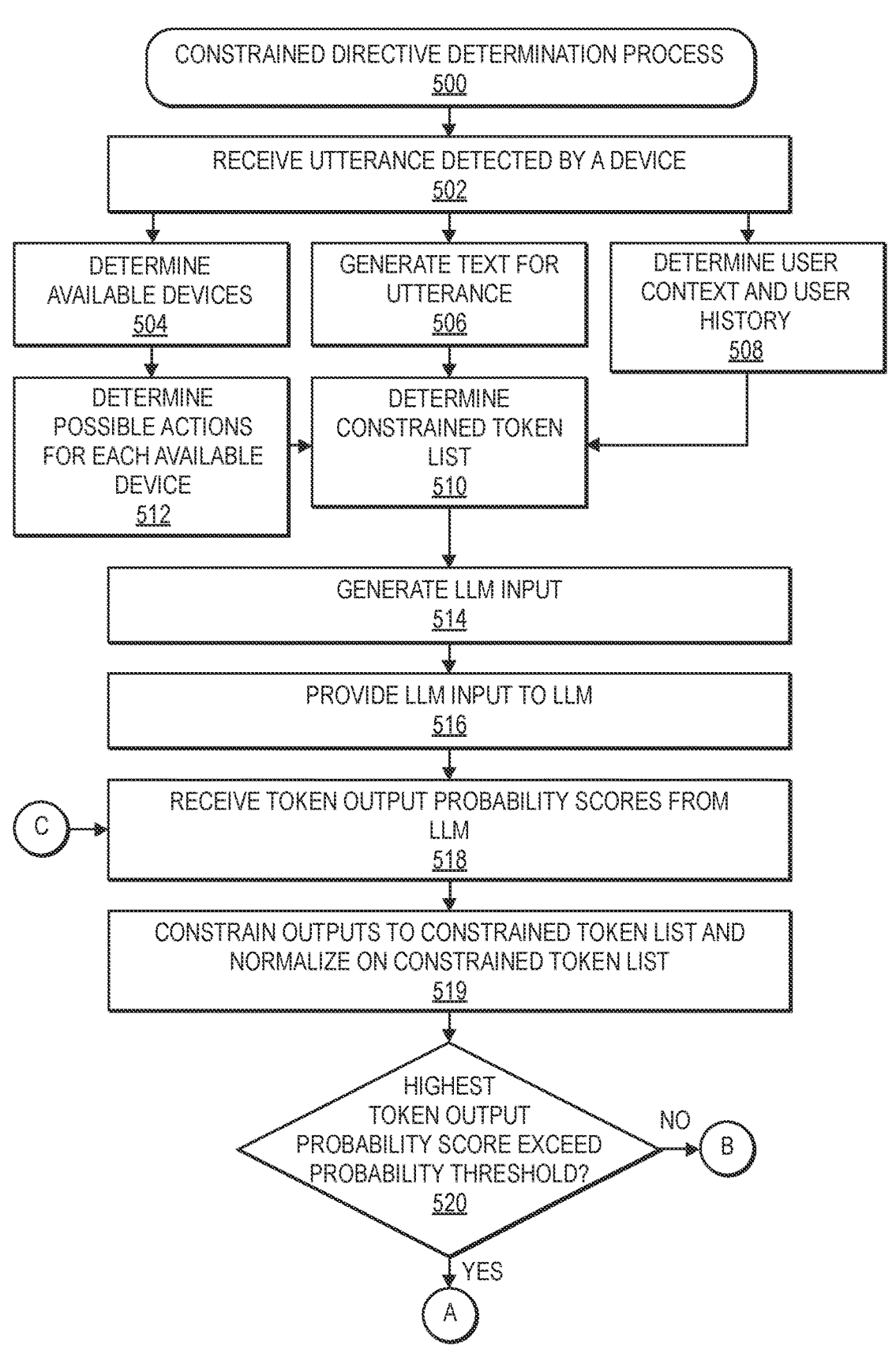
FIG. 5 is another example constrained directive determination process, in accordance with implementations of the present disclosure.
Figure 5:
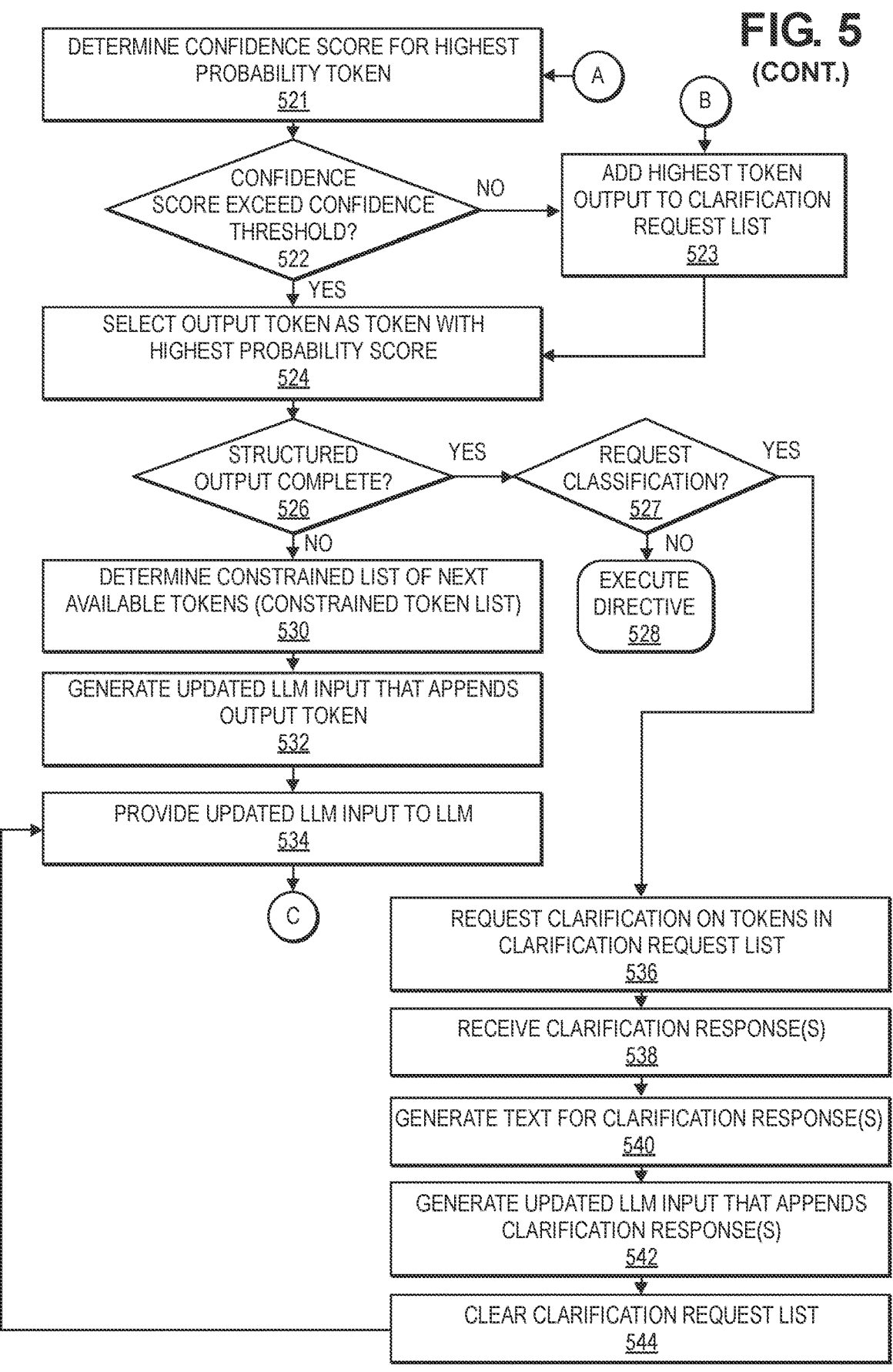

FIG. 5 is another example constrained directive determination process 500, in accordance with implementations of the present disclosure. The example process 500 may be utilized with each pass through the LLM to constrain the LLM to consider only a constrained list of tokens for each pass through the LLM.

The example process 500 begins upon receipt of an utterance detected by a device, as in 502, and as discussed above. Upon receipt of an utterance, the example process may determine available devices that may be used to perform a directive determined from the utterance, as in 504. For example, as discussed above, a user that generated the utterance may be determined and only devices associated with or authorized for use by that user may be identified. In another example, the device that recorded the utterance may be determined and only devices that are connected to or located with the device that received the utterance may be determined. As one example, if the device that received the utterance is a device in a user's home, all devices in the user's home that are known and capable of responding to a command or directive may be determined. Likewise, in some implementations, possible actions that may be performed or executed by each of the determined devices may also be determined, as in 512.

In addition to determining devices and actions that may be used to perform one or more directives determined from the utterance, the utterance may be converted to text, for example using ASR or other speech-to-text technique, as discussed above, as in 506. Likewise, a user context and user history may be determined for the user that generated the utterance, as in 508. User context and/or user history may include, but is not limited to, prior commands or directives generated for the user in response to user utterances, user preferences, user usage history, etc.

Based on the list of possible devices, possible actions that may be performed by those devices, the generated text, and the user context and user history, a constrained token list may be generated, as in 510. For example, the constrained token list may indicate all custom domain tokens, such as SMART HOME, MUSIC, CHATBOT, or other skill that is associated with the user or the devices associated with the user.

An LLM input may then be generated that includes instructions for the LLM, as in 514. The LLM input may include, for example, instructions for the LLM, the available devices, and the actions supported by each device type. An example LLM input is presented above. The generated LLM input may then be provided to an LLM tuned with the tokens, as discussed above with respect to FIG. 3, as in 516.

The LLM, for each pass through the LLM, generates and outputs probability scores for each of a plurality of tokens, including the tokens generated by the example process 300 (FIG. 3), indicating a probability that the token corresponds to the element for which the tokens are processed, as in 518. The output from the LLM may then be constrained to just the tokens indicated on the constrained token list and the probability scores for those tokens re-normalized across the tokens indicated on the constrained token list to generate a probability distribution based on just the constrained tokens, as in 519. For example, the LLM may output probability scores for thousands of tokens, including the tokens upon which it was tuned (FIG. 3). If the determined constrained token list includes four tokens, the LLM output will be constrained to those four tokens and the probability scores for those four tokens re-normalized with respect to those four tokens. A determination may then be made as to whether the highest probability score determined for a token of the constrained token list, once re-normalized, exceeds a probability threshold, as in 520. The probability threshold may be any value and may be different for different users, different actions, different domains, different devices, etc.

If it is determined that the highest re-normalized probability score, or at least one of the re-normalized probability scores exceeds the probability threshold, in some implementations, a confidence score may be determined for the token with the highest probability score, the confidence score indicating a confidence that the token with the highest probability score is the correct token, as in 521. The confidence score may be determined based on the highest probability score and/or based on probability scores determined for the other tokens of the constrained token list. For example, if the LLM output is constrained to five tokens and the determined probability scores for those five tokens are re-normalized to 0.75, 0.15, 0.05, 0.03, 0.02, a high confidence score may be associated with the token having the highest probability score because it is much more likely, in this example, that the token with the highest probability score is the correct token. Likewise, low probability scores may be assigned to the other tokens indicating that there is a low confidence that one of those tokens is the correct token. In comparison, if the probability scores were re-normalized to be 0.55, 0.25, 0.15, 0.03, and 0.02, the token corresponding to the highest probability score may receive a low confidence score because there is a high probability that more than one of the tokens on the constrained token list is the correct token. Likewise, in some implementations, some or all of the other tokens may also receive low confidence scores because there is a low confidence that any of those tokens are the correct token.

A determination may then be made as to whether the confidence score for the token with the highest probability score exceeds a confidence threshold, as in 522. Like the probability threshold, the confidence threshold may be any value and may be different for different users, different actions, different domains, different devices, etc. If it is determined that the confidence score for the token with the highest probability score exceeds the confidence threshold, the token with the highest probability score is selected as the output token for that pass through the LLM and the token added to the structured output to be generated by the LLM, as in 524.

A determination may then be made as to whether the structured output that is to be generated by the LLM is complete, as in 526.

If it is determined that the structured output is not complete, a constrained list of next available tokens for the LLM to consider is determined, referred to herein as a constrained token list, as in 530. As noted above, upon selection of a token for each element of the structured output that is to be generated by the LLM, there is a definitive list of tokens that may be considered for the next element of the structured output. Namely, only tokens of the next element that are related to the token selected for the current element of the structured output may be possible tokens for selection in the next element. As such, those tokens may be used to constrain the output generated by the LLM in the next pass through the LLM.

The LLM input may then be updated to append the token selected for that element of the structured output, as in 532.

The updated LLM input may then be provided to the LLM for processing again through the LLM in a next pass, as in 534.

Returning to decision block 522, if it is determined that the confidence score determined for the token with the highest probability score does not exceed the confidence threshold, or if it is determined at decision block 520 that the highest probability score does not exceed the probability threshold, the token with the highest probability score, and optionally other tokens with high probability scores may be added to a clarification request list, as in 523. In comparison to the example process 400 (FIG. 4), which may request clarification at each pass through the LLM, the example process 500 may generate a clarification request list but continue processing through the LLM input until the structured output is complete. If a pass through the LLM produces a token with a probability score that does not exceed the probability threshold and/or a confidence score that does not exceed the confidence threshold, a clarification request list may be generated that includes a request for clarification with respect to that token (and optionally other potential tokens for that pass through the LLM). In still other examples, the request for clarification list may include any number of tokens (or a defined number of tokens) with probability scores that exceed the probability threshold. As another example, a defined number of the constrained tokens with the highest confidence scores may be included in the request for clarification list. Upon adding the token(s) to the request for clarification list, the example process 500 continues at block 524 and select that token as an output token.

Returning to decision block 526, if it is determined that the structured output is complete, a determination is made as to whether clarification is to be requested, as in 527. For example, if one or more tokens are included in a clarification request list (523), it may be determined that a request for clarification is to be generated. If there are no tokens indicated in the request for clarification list, it may be determined that a request for clarification is not to be generated.

If it is determined at decision block 527 that a request for clarification is not to be generated, the structured output is sent by the example process 500 for execution, as in 528. If it is determined at decision block 527 that a request for clarification is to be generated, a request for clarification for each of the one or more tokens indicated in the request for clarification list may be generated and sent to the user that produced the utterance, as in 536. In some implementations, the request for clarification may be generated and sent by the LLM. In other implementations, the LLM may provide the tokens and probability scores from the request for clarification list to a separate service and the separate service may generate the request for clarification. In some implementations, the request for clarification may indicate the token(s) (e.g., device, activity, etc.) with the highest probability score along with a request that the user confirm that is the intent of the utterance. In other examples, the request for clarification may indicate two or more tokens and request clarification as to the intent of the user. If there are multiple tokens in the request for clarification list, the request for clarification may include a request with respect to each of those tokens and/or multiple exchanges may be performed with the user to resolve the tokens included in the request for clarification list. In still other examples, the request for clarification may include any number of tokens (or a defined number of tokens) with probability scores that exceed the probability threshold. As another example, a defined number of the constrained tokens with the highest confidence scores may be included in the request for clarification. The request for clarification may then be presented to the user that generated the utterance. For example, the device that recorded the utterance may generate an output (visual, audible, haptic) that includes the request for clarification and the user may provide the clarification to the device, or another device.

Upon receiving a clarification response(s), as in 538, such as another utterance from the user, the clarification response is processed to generate a textual representation of the clarification response, as in 540. An updated LLM input may then be generated that appends the clarification response(s) to the LLM input, as in 542. In addition, the request for clarification list may be cleared, as in 544. The example process 500 may then return to block 534 and provide the updated LLM input to the LLM. Because the LLM may maintain state information/session history, it can continue processing the LLM input with the updated information.

Figure 6:
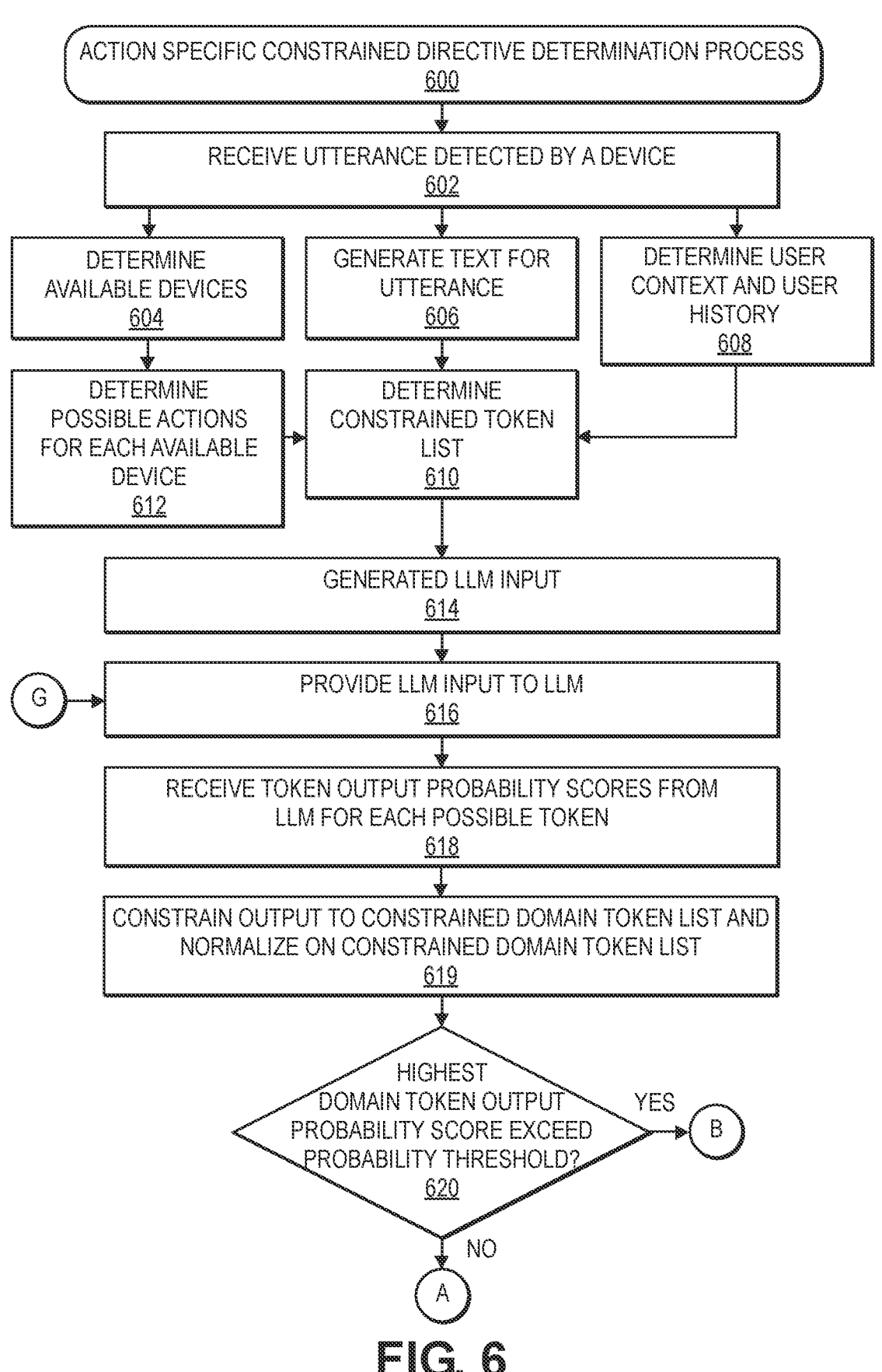
FIG. 6 is an example action specific constrained directive determination process, in accordance with implementations of the present disclosure.
Figure 6:
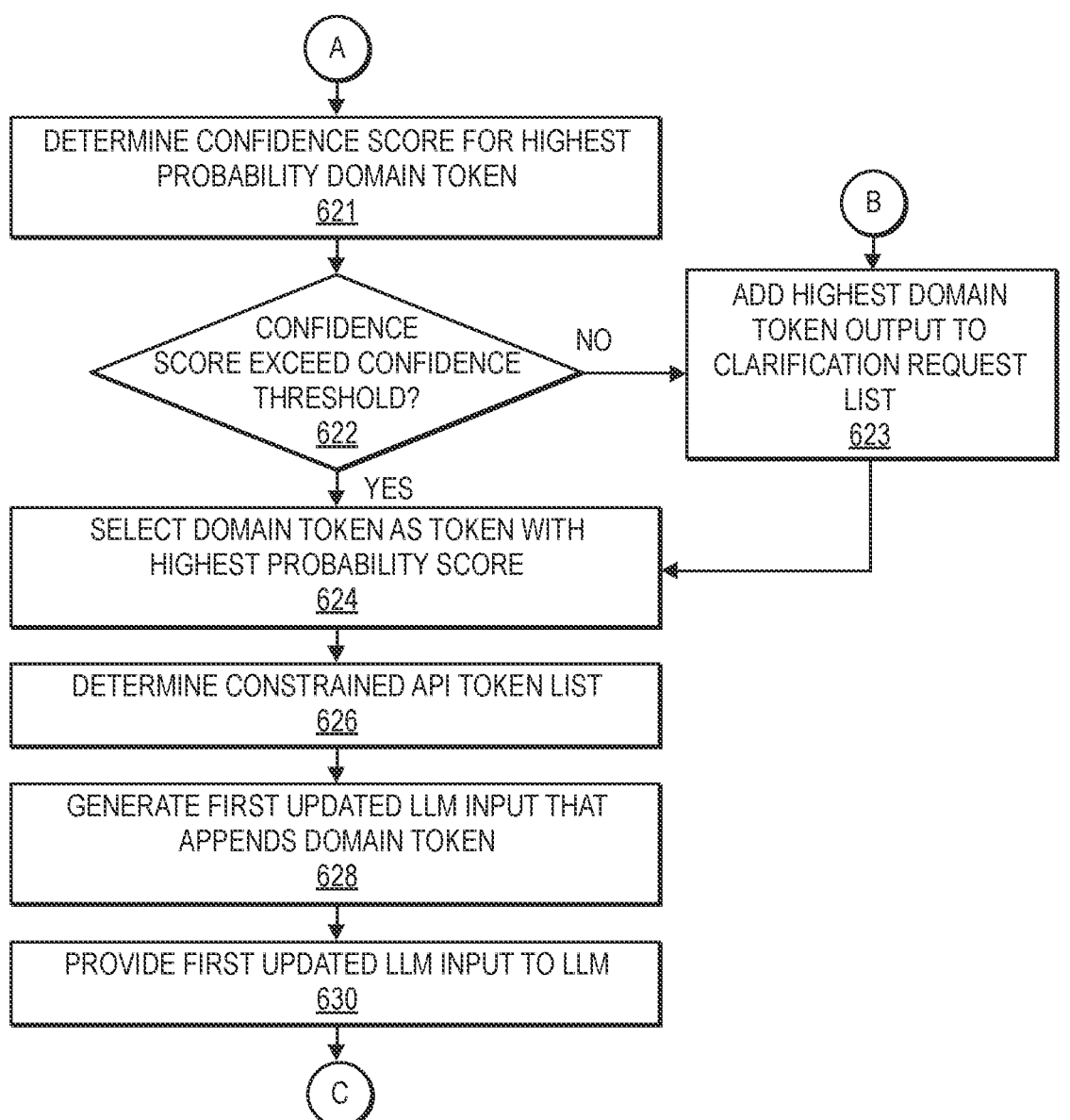
Figure 6:
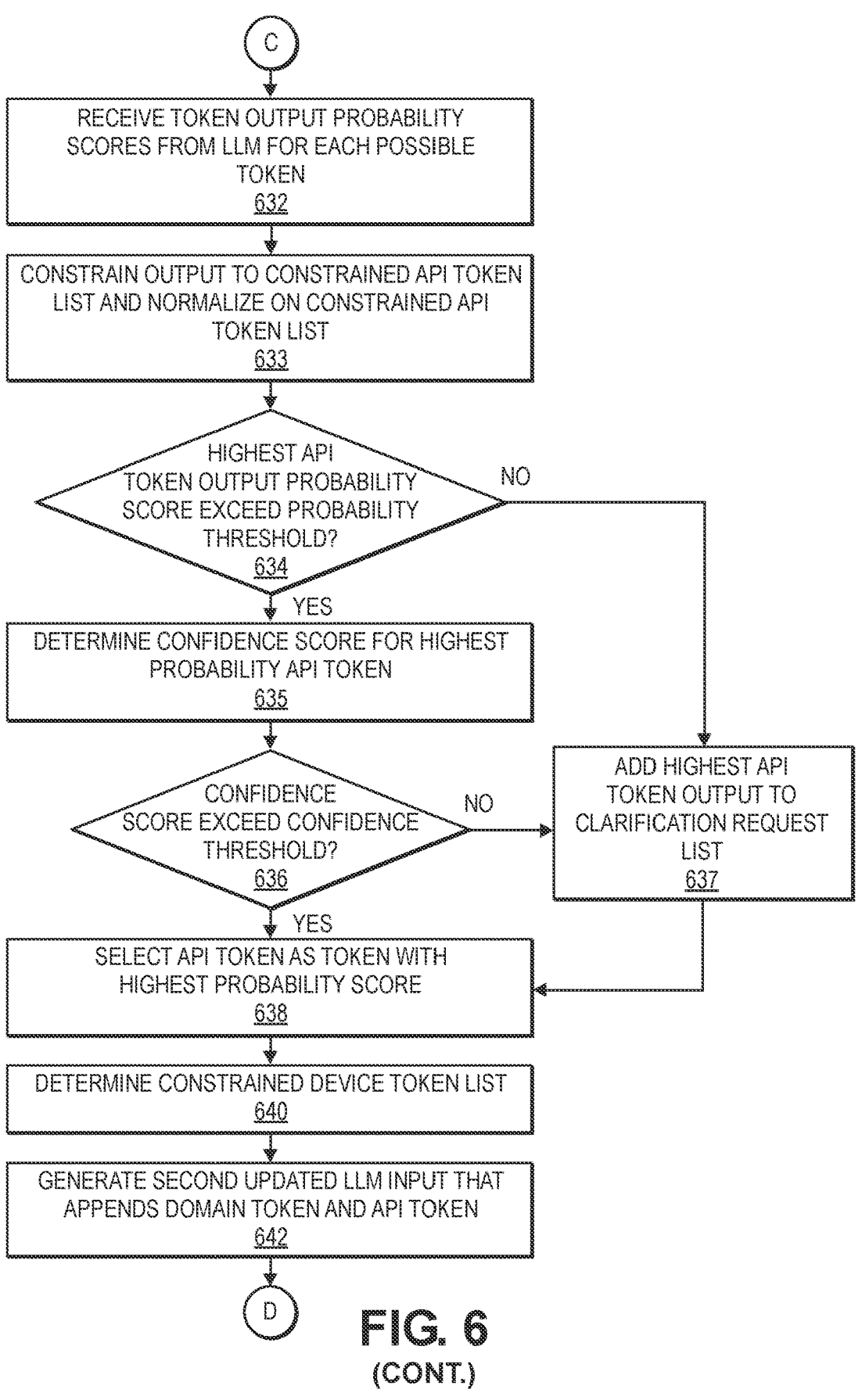
Figure 6:
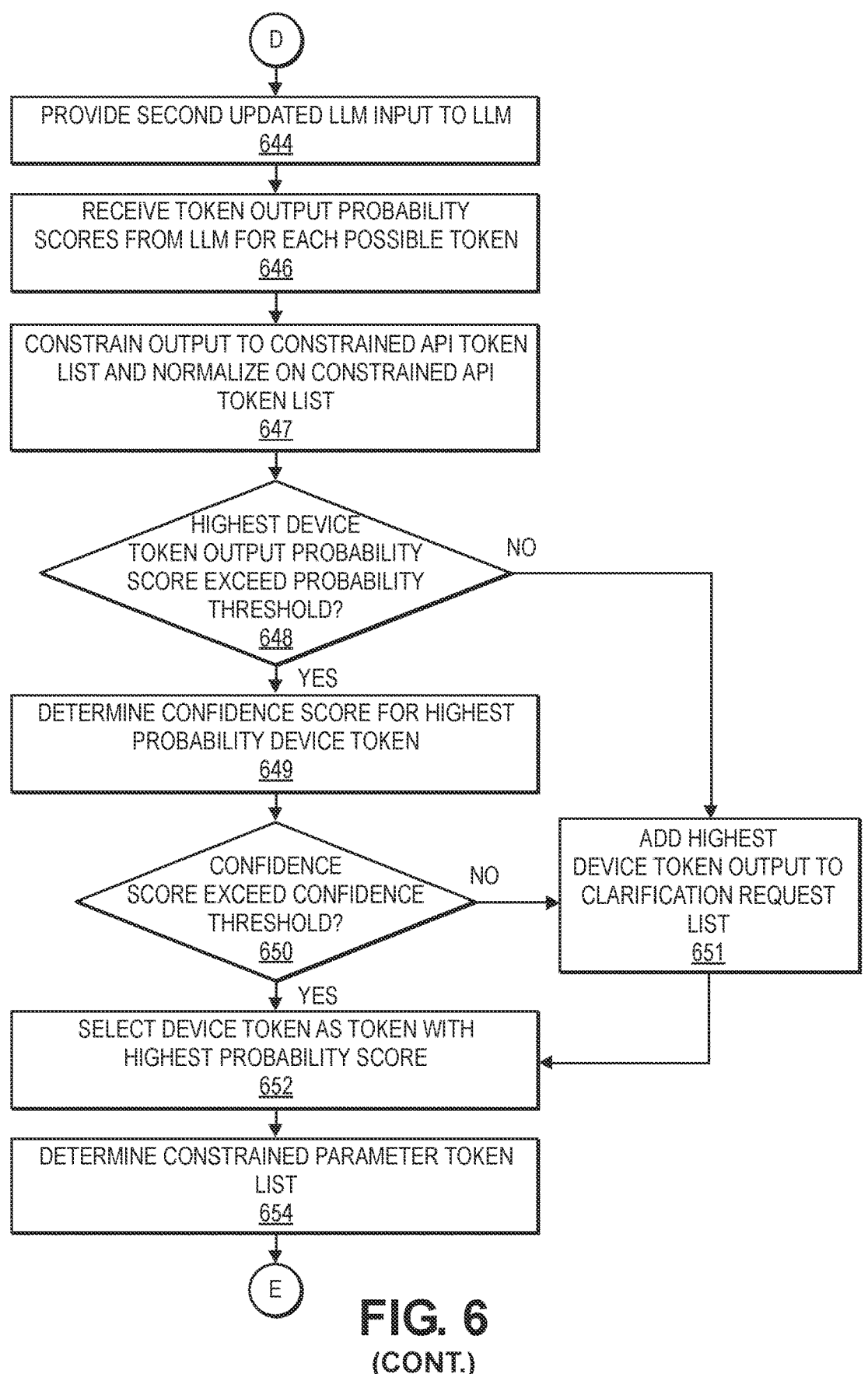
Figure 6:
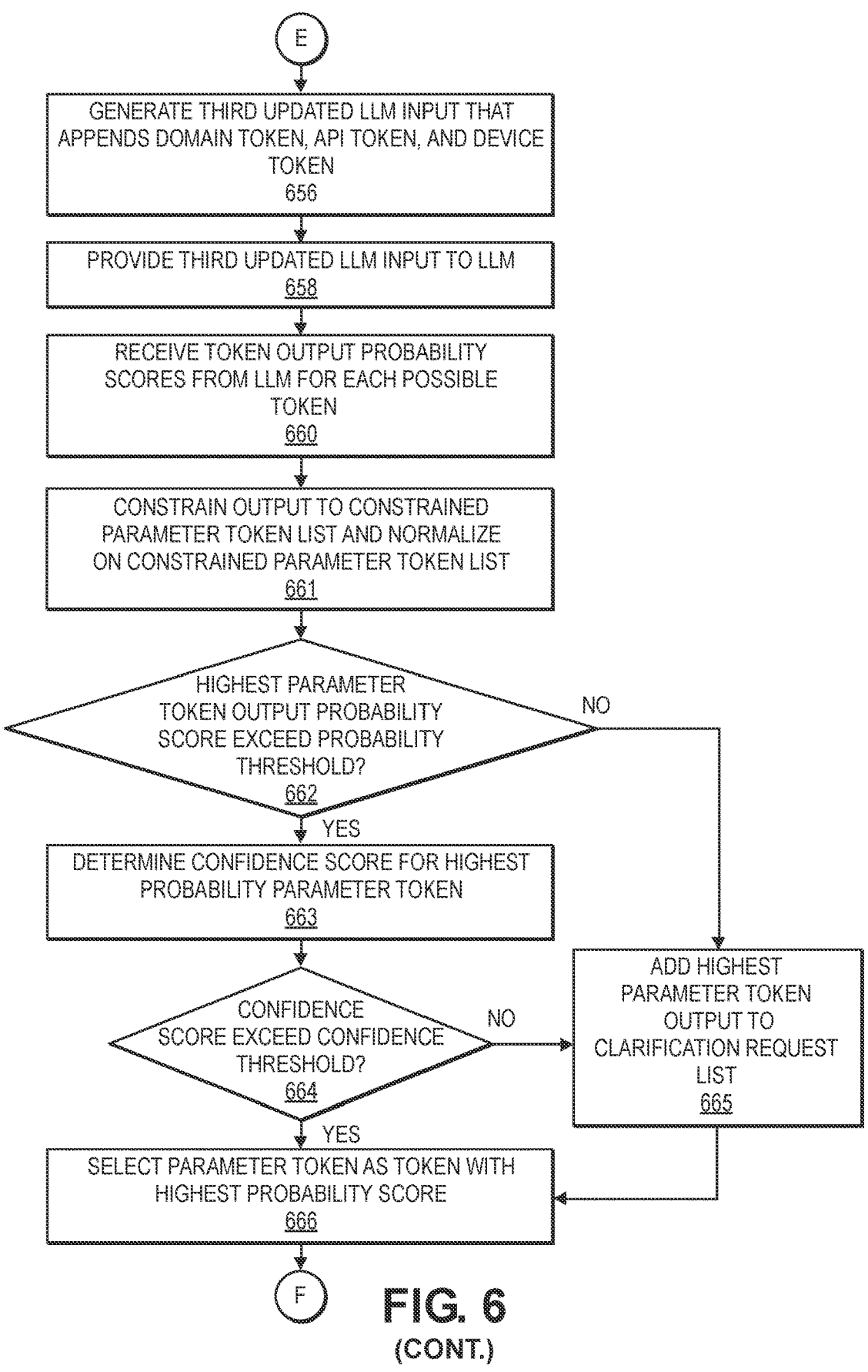
Figure 6:
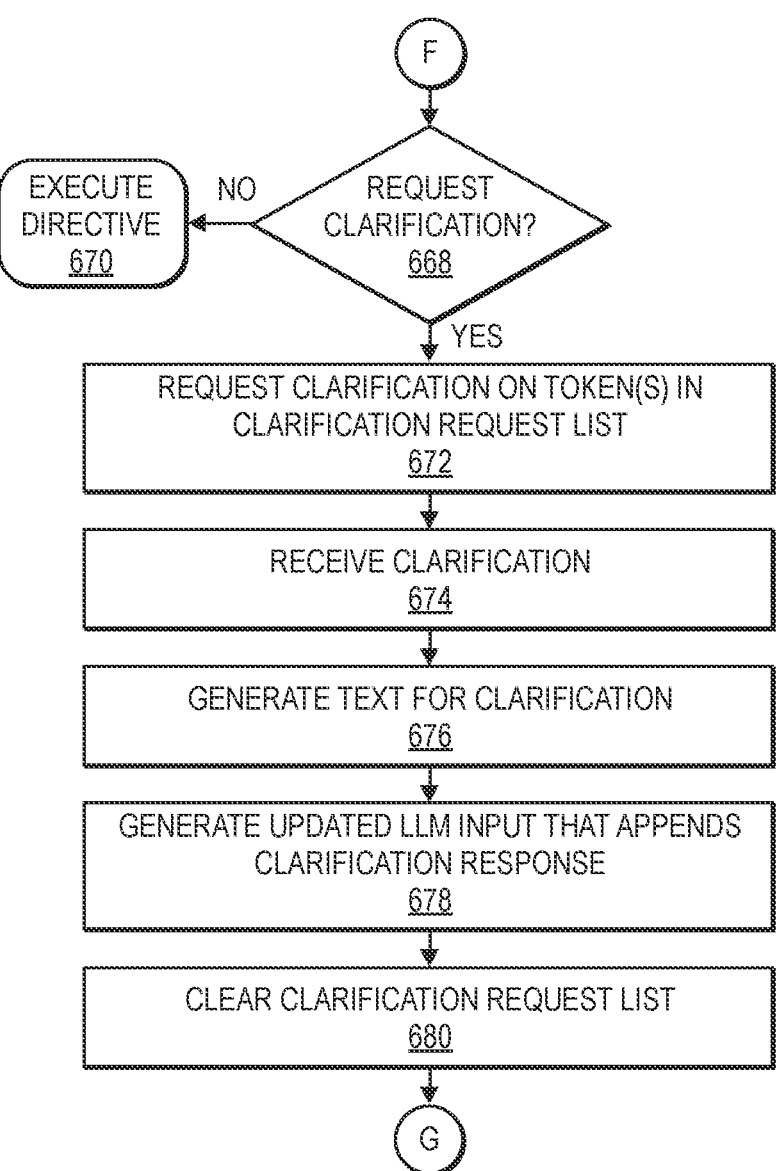

FIG. 6 is an example action specific constrained directive determination process 600, in accordance with implementations of the present disclosure. The example process 600 is provided as a specific use case for the example process 500 with a defined output structure that includes a DOMAIN, API_NAME, DEVICE, and PARAMETER that are to be completed with tokens in response to an utterance.

The example process 600 begins upon receipt of an utterance detected by a device, as in 602, and as discussed above. In the example discussed with respect to FIG. 6 and FIG. 7, the utterance is "Turn down my kitchen lights." Upon receipt of an utterance, the example process may determine available devices that may be used to perform a directive determined from the utterance, as in 604. For example, as discussed above, a user that generated the utterance may be determined and only devices associated with or authorized for use by that user may be identified. In another example, the device that recorded the utterance may be determined and only devices that are connected to or located with the device that received the utterance may be determined. As one example, if the device that received the utterance is a device in a user's home, all devices in the user's home that are known and capable of responding to a command or directive may be determined. Likewise, in some implementations, possible actions that may be performed or executed by each of the determined devices may also be determined, as in 612.

In addition to determining devices and actions that may be used to perform one or more directives determined from the utterance, the utterance may be converted to text, for example using ASR or other speech-to-text technique, as discussed above, as in 606. Likewise, a user context and user history may be determined for the user that generated the utterance, as in 608. User context and/or user history may include, but is not limited to, prior commands or directives generated for the user in response to user utterances, user preferences, user usage history, etc.

Based on the list of possible devices, possible actions that may be performed by those devices, the generated text, and the user context and user history, a constrained domain token list may be generated, as in 610. For example, and referring to FIG. 7, the constrained domain token list may indicate all custom domain tokens that may be accessed by the user that generated the utterance. In this example, the domain tokens include SMART HOME, MUSIC, VIDEO, and WEATHER. As will be appreciated, other and/or different domain tokens may also be included and those provided are for illustration purposes only.

An LLM input (712) may then be generated that includes instructions for the LLM (701), as in 614. The LLM input may include, for example, instructions for the LLM, the available devices, and the actions supported by each device type. The generated LLM input may then be provided to an LLM (701) tuned with the tokens, as discussed above with respect to FIG. 3, as in 616.

The LLM generates and outputs probability scores for each of a plurality of tokens, including the tokens generated by the example process 300 (FIG. 3), indicating a probability that the token corresponds to the domain element, as in 618. The output from the LLM may then be constrained to just the tokens indicated on the constrained domain token list and the probability scores for those tokens re-normalized across the tokens indicated on the constrained domain token list to generate a probability distribution based on just the constrained domain tokens, as in 619. For example, the LLM (701) may output probability scores for thousands of tokens, including the tokens upon which it was tuned (FIG. 3). If the determined constrained domain token list includes the domain tokens (713) of SMART HOME, MUSIC, VIDEO, and WEATHER, the LLM output will be constrained to just those domain tokens and probability scores for each of those domain tokens re-normalized with respect to those domain tokens (714). The re-normalized domain token probability scores for those constrained domain tokens indicate a probability score for each domain token as to whether that domain token is the proper token for the domain element that will be included in the structured output. A determination may then be made as to whether the highest probability score determined for a domain token, in this example the domain token SMART HOME, exceeds a probability threshold, as in 620. The probability threshold may be any value and may be different for different users, different actions, different domains, different devices, etc.

Figure 7:
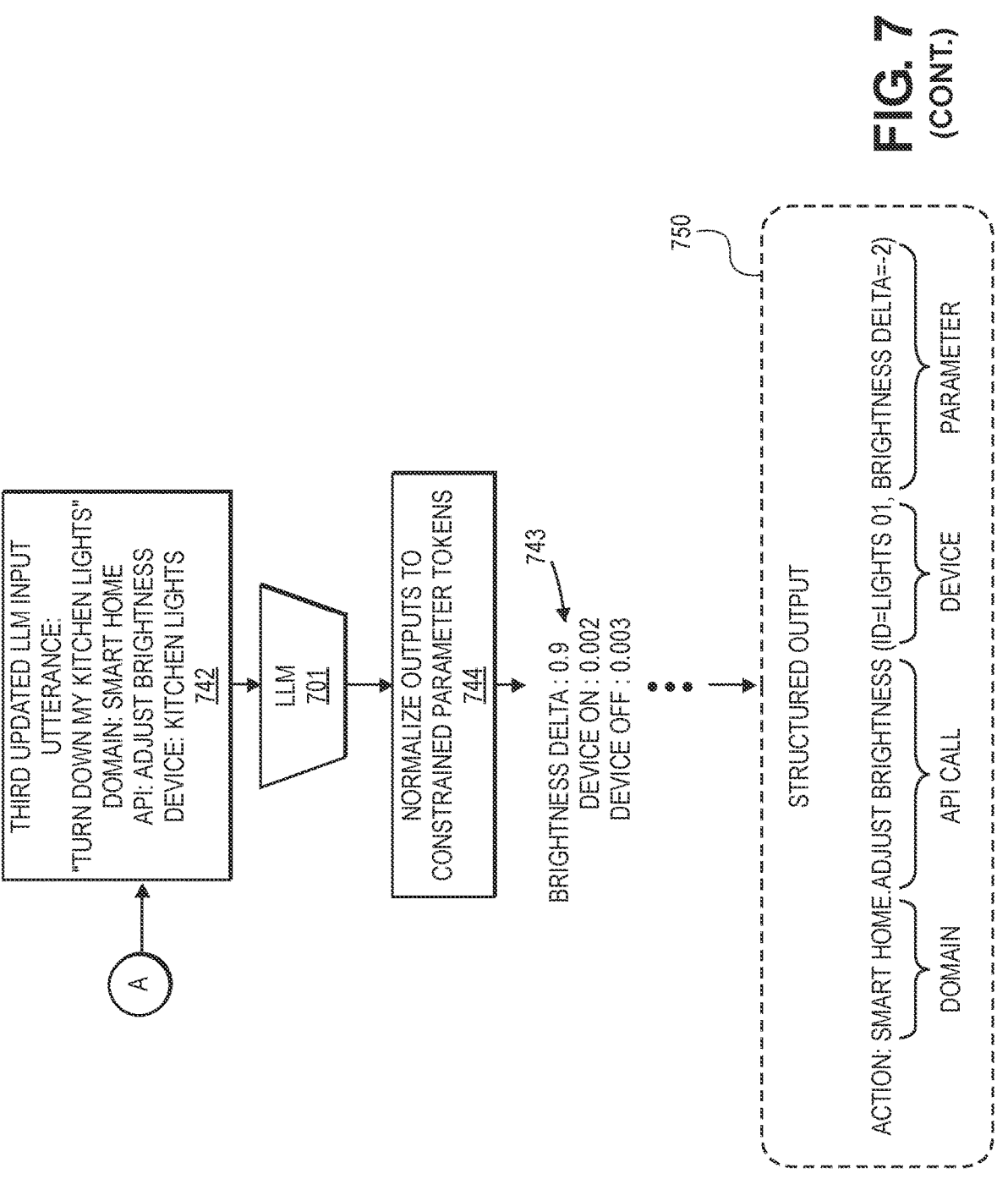
FIG. 7 is an illustration of block diagram illustrating outputs of each forward pass through a large language model performed as part of the example action specific constrained directive determination process of FIG. 6, in accordance with implementations of the present disclosure.

If it is determined that the highest probability score exceeds the probability threshold, in some implementations, a confidence score may be determined for the domain token with the highest probability score, the confidence score indicating a confidence that the domain token with the highest probability score is the correct domain token, as in 621. The confidence score may be determined based on the highest probability score and/or based on probability scores determined for the other domain tokens. As illustrated in FIG. 7, in this example, the LLM (701) determined re-normalized probability scores of SMART HOME: 0.8, MUSIC: 0.001, VIDEO: 0.005, and WEATHER: 0.004. Because smart home has a high re-normalized probability score and the other domain tokens have low probability scores, the domain token SMART HOME will have a high confidence score because it is much more likely, in this example, that the domain token SMART HOME is the correct domain token. In comparison, if the re-normalized probability scores were determined to be 0.25, 0.25, 0.15, and 0.1, the SMART HOME domain token would receive a low confidence score because there is a high probability that more than one of the domain tokens is the correct domain token.

A determination may then be made as to whether the confidence score for the domain token with the highest probability score exceeds a confidence threshold, as in 622. Like the probability threshold, the confidence threshold may be any value and may be different for different users, different actions, different domains, different devices, etc. If it is determined that the confidence score determined for the domain token with the highest probability score does not exceed the confidence threshold, or if it is determined at decision block 620 that the highest probability score does not exceed the probability threshold, the domain token with the highest probability score, and optionally other domain tokens with high probability scores, similar confidence scores, etc., may be added to a clarification request list, as in 623. Like FIG. 5, in this example, the example process 600 may generate a clarification request list but continue processing through the LLM input until the structured output is complete. Upon adding the domain token(s) to the request for clarification list, the example process 600 continues at block 624.

In comparison, if it is determined that the confidence score for the domain token with the highest probability score exceeds the confidence threshold, the domain token with the highest probability score is selected as the output domain token for that pass through the LLM and the domain token added to the structured output to be generated by the LLM, as in 624.

In this example, a constrained list of API tokens is then generated, as in 626. Because the domain token of SMART HOME was determined as the domain token, the constrained API list will only include API tokens that can be used in the domain SMART HOME and may be further constrained based on devices associated with the user, location, etc., user history, and/or other factors. Referring again to FIG. 7, in this example, the API tokens 723 included in the constrained API token list include ADUSTBRIGHTNESS, SET-BRIGHTNESS, TURNON, and TURNOFF. As will be appreciated, other and/or different API tokens may be included in constrained AIP token list.

The LLM input may then be updated (716) to append the selected domain token for the domain element of the structured output, as in 628, and as illustrated by first updated LLM input 722 of FIG. 7.

The first updated LLM input (722) may then be provided to the LLM (701) for processing again through the LLM in a next pass, as in 630.

The LLM generates and outputs probability scores for each of a plurality of tokens, including the tokens generated by the example process 300 (FIG. 3), indicating a probability that the token corresponds to the API element, as in 632. The output from the LLM may then be constrained to just the tokens indicated on the constrained API token list and the probability scores for those tokens re-normalized across the tokens indicated on the constrained API token list to generate a probability distribution based on just the constrained API tokens, as in 633. For example, the LLM (701) may output probability scores for thousands of tokens, including the tokens upon which it was tuned (FIG. 3). If the determined constrained API token list includes the API tokens (723) of ADJUSTBRIGHTNESS, SETBRIGHTNESS, TURNON, and TURNOFF, the LLM output will be constrained to just those API tokens and probability scores for each of those API tokens re-normalized with respect to those API tokens (724). The re-normalized API token probability scores for those constrained API tokens indicate a probability score for each API token as to whether that API token is the proper token for the API element that will be included in the structured output. A determination may then be made as to whether the highest probability score determined for an API token, in this example the API token ADJUSTBRIGHT-NESS, exceeds a probability threshold, as in 634.

If it is determined that the highest probability score exceeds the probability threshold, in some implementations, a confidence score may be determined for the API token with the highest probability score, the confidence score indicating a confidence that the API token with the highest probability score is the correct API token, as in 635. The confidence score may be determined based on the highest probability score and/or based on probability scores determined for the other domain tokens. As illustrated in FIG. 7, in this example, the LLM (701) determined re-normalized probability scores of ADJUSTBRIGHTNESS: 0.9, SET-BRIGHTNESS: 0.003, TURNON: 0.005, and TURNOFF:

0.001. Because ADJUSTBRIGHTNESS has a high re-normalized probability score and the other API tokens have low probability scores, the API token ADJUSTBRIGHTNESS will have a high confidence score because it is much more likely, in this example, that the API token ADJUST-BRIGHTNESS is the correct API token. In comparison, if the re-normalized probability scores were determined to be 0.25, 0.25, 0.15, and 0.1, the ADJUSTBRIGHTNESS API token would receive a low confidence score because there is a high probability that more than one of the API tokens is the correct API token.

A determination may then be made as to whether the confidence score for the API token with the highest probability score exceeds a confidence threshold, as in 636. If it is determined that the confidence score determined for the API token with the highest probability score does not exceed the confidence threshold, or if it is determined at decision block 634 that the highest probability score does not exceed the probability threshold, the API token with the highest probability score, and optionally other API tokens with high probability scores, similar confidence scores, etc., may be added to a clarification request list, as in 637. Upon adding the API token(s) to the request for clarification list, the example process 600 continues at block 638.

In comparison, if it is determined that the confidence score for the API token with the highest probability score exceeds the confidence threshold, the API token with the highest probability score is selected as the output API token for that pass through the LLM and the API token is added to the structured output to be generated by the LLM, as in 638.

In this example, a constrained list of device tokens is then generated, as in 640. Because the API token of ADJUST-BRIGHTNESS was determined as the API token, the constrained device list will only include device tokens that can be called by the API token and may be further constrained based on devices associated with the user, location, etc., user history, and/or other factors. Referring again to FIG. 7, in this example, the device tokens 733 included in the constrained device token list include BEDROOM LIGHTS, BATHROOM LIGHTS, KITCHEN LIGHTS, and OUT-DOOR LIGHTS. As will be appreciated, other and/or different device tokens may be included in constrained device token list.

The LLM input may then be updated (726) to append the selected domain token and the selected API token of the structured output, as in 642, and as illustrated by second updated LLM input 732 of FIG. 7.

The second updated LLM input (732) may then be provided to the LLM (701) for processing again through the LLM in a next pass, as in 644.

The LLM generates and outputs probability scores for each of a plurality of tokens, including the tokens generated by the example process 300 (FIG. 3), indicating a probability that the token corresponds to the device element, as in 646. The output from the LLM may then be constrained to just the tokens indicated on the constrained device token list and the probability scores for those tokens re-normalized across the tokens indicated on the constrained device token list to generate a probability distribution based on just the constrained device tokens, as in 647. For example, the LLM (701) may output probability scores for thousands of tokens, including the tokens upon which it was tuned (FIG. 3). If the determined constrained domain token list includes the device tokens (733) of BEDROOM LIGHTS, BATHROOM LIGHTS, KITCHEN LIGHTS, and OUTDOOR LIGHTS, the LLM output will be constrained to just those device tokens and probability scores for each of those device tokens re-normalized with respect to those device tokens (734). The re-normalized device token probability scores for those constrained device tokens indicate a probability score for each device token as to whether that device token is the proper token for the device element that will be included in the structured output. A determination may then be made as to whether the highest probability score determined for a device token, in this example the device token KITCHEN LIGHTS, exceeds a probability threshold, as in 648.

If it is determined that the highest probability score exceeds the probability threshold, in some implementations, a confidence score may be determined for the device token with the highest probability score, the confidence score indicating a confidence that the device token with the highest probability score is the correct device token, as in 649. The confidence score may be determined based on the highest probability score and/or based on probability scores determined for the other device tokens. As illustrated in FIG. 7, in this example, the LLM (701) determined re-normalized probability scores of BEDROOM LIGHTS: 0.003, BATH-ROOM LIGHTS: 0.004, KITCHEN LIGHTS: 0.8, and OUTDOOR LIGHTS: 0.001. Because KITCHEN LIGHTS has a high re-normalized probability score and the other device tokens have low probability scores, the device token KITCHEN LIGHTS will have a high confidence score because it is much more likely, in this example, that the device token KITCHEN LIGHTS is the correct device token. In comparison, if the re-normalized probability scores were determined to be 0.25, 0.25, 0.15, and 0.1, the KITCHEN LIGHTS device token would receive a low confidence score because there is a high probability that more than one of the device tokens is the correct device token.

A determination may then be made as to whether the confidence score for the device token with the highest probability score exceeds a confidence threshold, as in 650. If it is determined that the confidence score determined for the device token with the highest probability score does not exceed the confidence threshold, or if it is determined at decision block 648 that the highest probability score does not exceed the probability threshold, the device token with the highest probability score, and optionally other device tokens with high probability scores, similar confidence scores, etc., may be added to a clarification request list, as in 651. Upon adding the device token(s) to the request for clarification list, the example process 600 continues at block 652.

In comparison, if it is determined that the confidence score for the device token with the highest probability score exceeds the confidence threshold, the device token with the highest probability score is selected as the output device token for that pass through the LLM and the device token added to the structured output to be generated by the LLM, as in 652.

In this example, a constrained list of parameter tokens is then generated, as in 654. Because the device token of KITCHEN LIGHTS was determined as the device token, the constrained parameter list will only include parameter tokens that can be performed by the device kitchen lights and may be further constrained based on devices associated with the user, location, etc., user history, and/or other factors. Referring again to FIG. 7, in this example, the parameter tokens 743 included in the constrained parameter token list include BRIGHTNESS DELTA, DEVICE ON, and DEVICE OFF. As will be appreciated, other and/or different parameter tokens may be included in constrained parameter token list.

The LLM input may then be updated (736) to append the selected domain token, the selected API token, and the selected device token of the structured output, as in 656, and as illustrated by third updated LLM input 742 of FIG. 7.

The third updated LLM input (742) may then be provided to the LLM (701) for processing again through the LLM in a next pass, as in 658.

The LLM generates and outputs probability scores for each possible plurality of tokens, including the tokens generated by the example process 300 (FIG. 3), indicating a probability that the token corresponds to the parameter element, as in 660. The output from the LLM may then be constrained to just the tokens indicated on the constrained parameter token list and the probability scores for those tokens re-normalized across the tokens indicated on the constrained parameter token list to generate a probability distribution based on just the constrained parameter tokens, as in 661. For example, the LLM (701) may output probability scores for thousands of tokens, including the tokens upon which it was tuned (FIG. 3). If the determined constrained parameter token list includes the parameter tokens (743) of BRIGHTNESS DELTA, DEVICE ON, and DEVICE OFF, the LLM output will be constrained (744) to just those parameter tokens and probability scores for each of those parameter tokens re-normalized with respect to those parameter tokens (743). The re-normalized parameter token probability scores for those constrained parameter tokens indicating a probability score for each parameter token as to whether that parameter token is the proper token for the parameter element that will be included in the structured output. A determination may then be made as to whether the highest probability score determined for a parameter token, in this example the parameter token BRIGHTNESS DELAY, exceeds a probability threshold, as in 662.

If it is determined that the highest probability score exceeds the probability threshold, in some implementations, a confidence score may be determined for the parameter token with the highest probability score, the confidence score indicating a confidence that the parameter token with the highest probability score is the correct parameter token, as in 663. The confidence score may be determined based on the highest probability score and/or based on probability scores determined for the other parameter tokens. As illustrated in FIG. 7, in this example, the LLM (701) determined re-normalized probability scores of BRIGHTNESS DELTA: 0.9, DEVICE ON: 0.002, and DEVICE OFF: 0.003. Because BRIGHTNESS DELAY has a high re-normalized probability score and the other parameter tokens have low re-normalized probability scores, the parameter token BRIGHTNESS DELTA will have a high confidence score because it is much more likely, in this example, that the parameter token BRIGHTNESS DELTA is the correct parameter token. In comparison, if the probability scores were determined to be 0.25, 0.25, 0.15, and 0.1, the BRIGHTNESS DELTA parameter token would receive a low confidence score because there is a high probability that more than one of the parameter tokens is the correct parameter token.

A determination may then be made as to whether the confidence score for the parameter token with the highest probability score exceeds a confidence threshold, as in 664. If it is determined that the confidence score determined for the parameter token with the highest probability score does not exceed the confidence threshold, or if it is determined at decision block 648 that the highest probability score does not exceed the probability threshold, the parameter token with the highest probability score, and optionally other parameter tokens with high probability scores, similar confidence scores, etc., may be added to a clarification request list, as in 665. Upon adding the parameter token(s) to the request for clarification list, the example process 600 continues at block 666.

In comparison, if it is determined that the confidence score for the parameter token with the highest probability score exceeds the confidence threshold, the parameter token with the highest probability score is selected as the output parameter token for that pass through the LLM and the parameter token added to the structured output to be generated by the LLM, as in 666.

After processing through the LLM to determine tokens for each element of the structured output that is to be generated by the LLM, a determination is made as to whether clarification is to be requested, as in 668. As discussed above, if one or more tokens are included in a clarification request list as part of the example process 600, it may be determined that a request for clarification is to be generated. If there are no tokens indicated in the request for clarification list, it may be determined that a request for clarification is not to be generated.

If it is determined at decision block 668 that a request for clarification is not to be generated, the structured output is sent by the example process 600 for execution, as in 670. For example, referring again to FIG. 7, upon completion of the example process 600 in accordance with the disclosed example, the structured output 750 may be generated and sent for execution.

If it is determined at decision block 668 that a request for clarification is to be generated, a request for clarification for each of the one or more tokens indicated in the request for clarification list may be generated and sent to the user that produced the utterance, as in 672. In some implementations, the request for clarification may be generated and sent by the LLM. In other implementations, the LLM may provide the tokens and probability scores to a separate service and the separate service may generate the request for clarification. In some implementations, the request for clarification may indicate the token(s) (e.g., domain, API, device, activity, etc.) with the highest re-normalized probability score along with a request that the user confirm that is the intent of the utterance. In other examples, the request for clarification may indicate two or more tokens and request clarification as to the intent of the user. In still other examples, the request for clarification may include any number of tokens (or a defined number of tokens) with probability scores that exceed the probability threshold. As another example, a defined number of the constrained tokens with the highest confidence scores may be included in the request for clarification. If there are multiple tokens in the request for clarification list, the request for clarification may include a request with respect to each of those tokens and/or multiple exchanges may be performed with the user to resolve the tokens included in the request for clarification list. The request for clarification may then be presented to the user that generated the utterance. For example, the device that recorded the utterance may generate an output (visual, audible, haptic) that includes the request for clarification and the user may provide the clarification to the device, or another device.

Upon receiving a clarification response(s), as in 674, such as another utterance from the user, the clarification response is processed to generate a textual representation of the clarification response, as in 676. An updated LLM input may then be generated that appends the clarification response(s)

to the LLM input, as in 678. In addition, the request for clarification list may be cleared, as in 680. Finally, the example process 600 may then return to block 616 and provide the LLM input to the LLM. Because the LLM may maintain state information/session history, it can continue processing the LLM input with the updated information.

Figure 8:
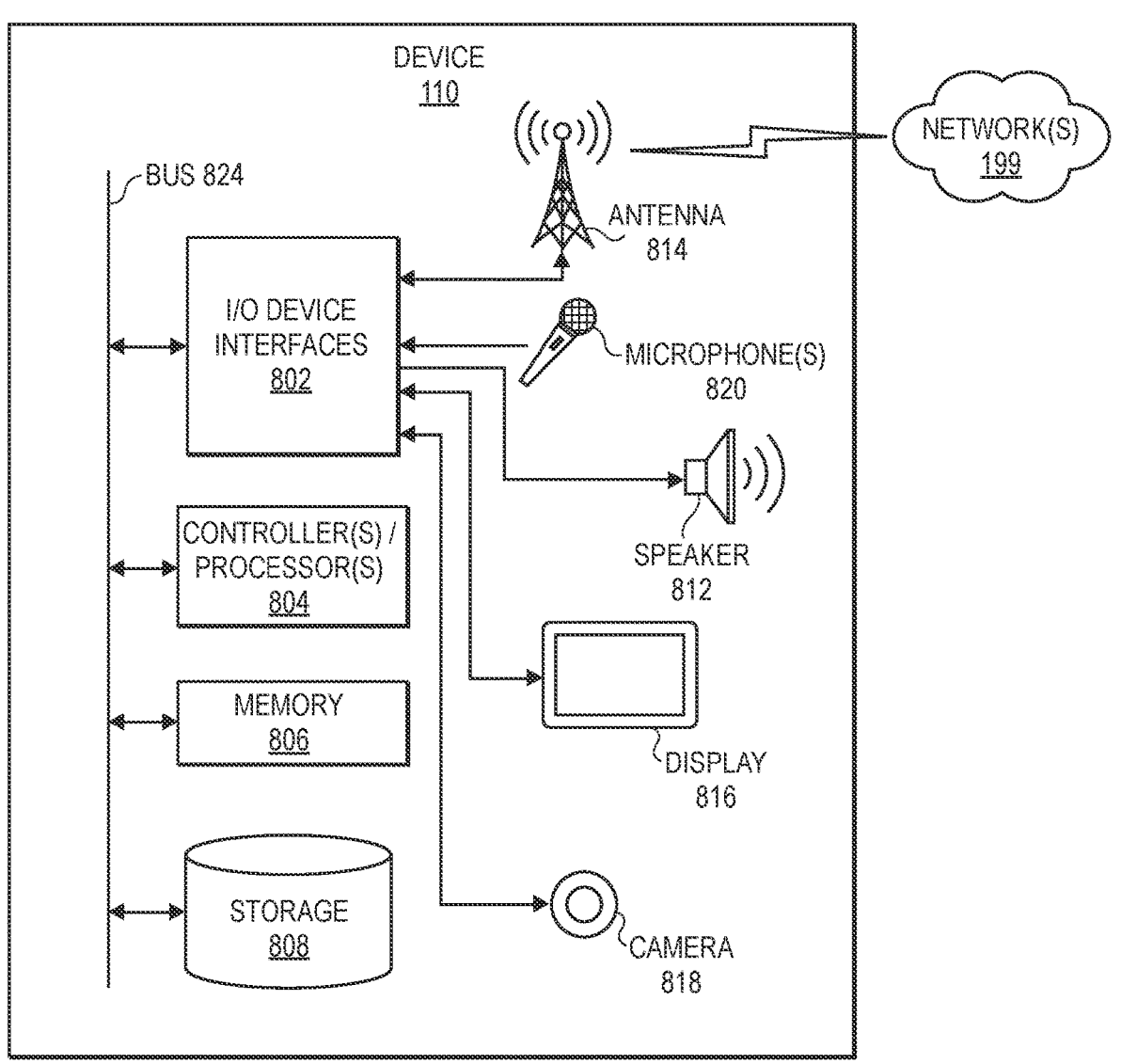
FIG. 8 is a block diagram conceptually illustrating example components of a device, in accordance with implementations of the present disclosure.
Figure 9:
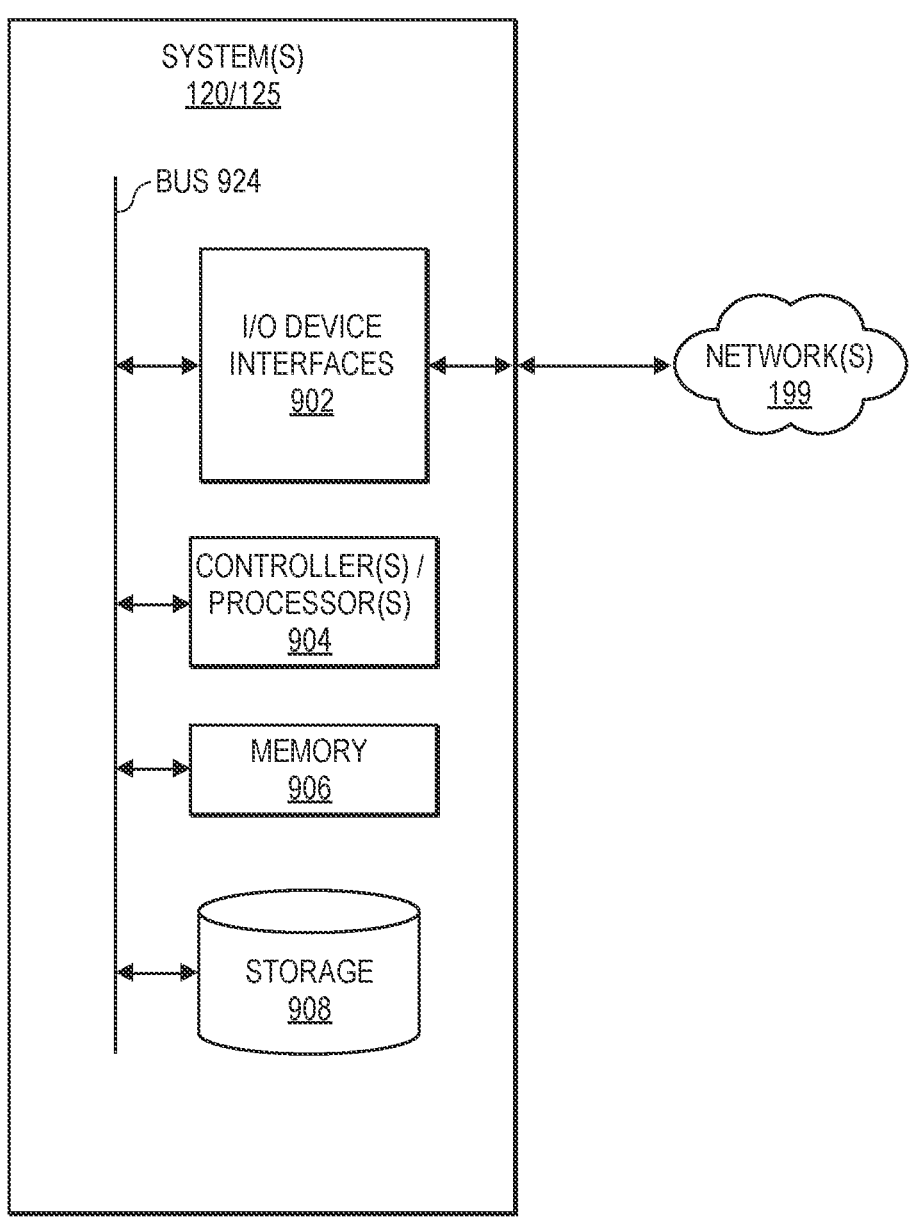
FIG. 9 is a block diagram conceptually illustrating example components of a system, in accordance with implementations of the present disclosure.

FIG. 8 is a block diagram conceptually illustrating a device 110 that may be used with the system, in accordance with implementations of the present disclosure. FIG. 9 is a block diagram conceptually illustrating example components of a remote device, such as the remote system 120, which may assist with ASR processing, LLM processing, etc., and skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulate a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems for performing ASR processing, one or more LLMs for performing LLM processing, one or more skill systems 125, etc. In operation, each of these systems may include computer-readable and computer-executable instructions that reside on the respective device (120/125).

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset, or other component capable of outputting audio. The device 110 may also include an audio capture component. The audio capture component may be, for example, a microphone 820 or array of microphones, a wired headset or a wireless headset, etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi®) radio, Bluetooth®, and/or wireless network radio, such as a radio capable of communication with a wireless communication network such as a Long Term Evolution (LTE) network, WiMAX® network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the remote system 120, and/or skill system(s) 125 may include their own dedicated processors, memory, and/or storage. Alternatively, one or more of the components of the device 110, the remote system 120, and/or skill system(s) 125 may utilize the I/O interfaces (802/902), processor(s) (804/904), memory (806/906), and/or storage (808/908) of the device(s) 110, remote system 120, or the skill system(s) 125, respectively. Thus, the ASR component 250 may have its own I/O interface(s), processor(s), memory, and/or storage; the LLM component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and skill system(s) 125, as described herein, are illustrative, and may be located as a stand-alone device or may be included, in whole or in part, as a component of a larger device or system.

Figure 10:
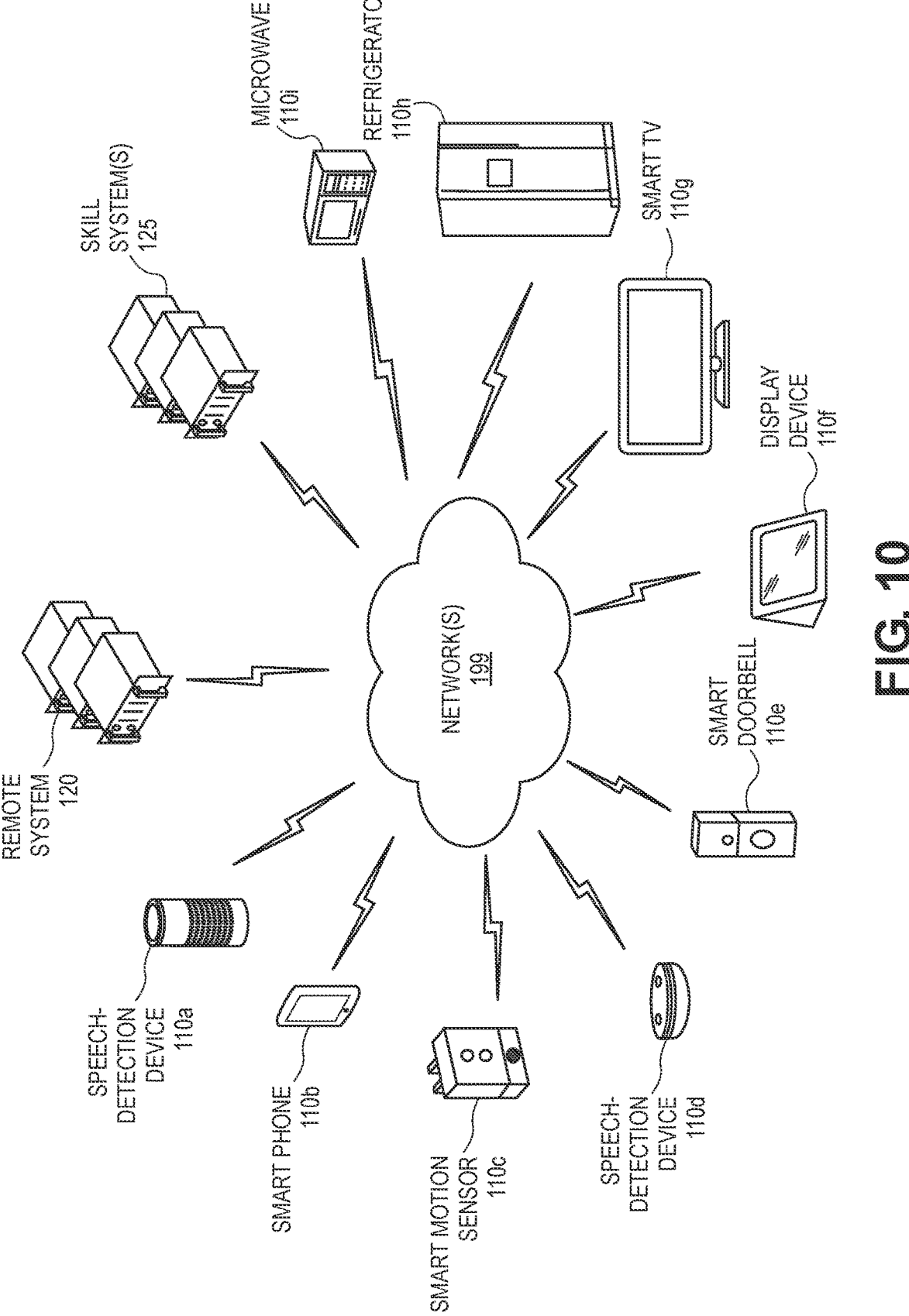
FIG. 10 illustrates an example of a computer network for use with the overall system, in accordance with implementations of the present disclosure.

As illustrated in FIG. 10, multiple devices (110a-110i, 120, 125) may contain components of the system and the devices may be connected over a network(s) 199. The network(s) 199 may include a local or private network or may include a wide area network such as the Internet. Devices may be connected to the network(s) 199 through either wired or wireless connections. For example, a speech-detection device 110a, a smart phone 110b, a smart motion sensor 110c, a speech-detection device 110d, a smart doorbell 110e, a display device 110f, a smart television 110g, a refrigerator 110h, and/or a microwave 110i may be connected to the network(s) 199 through a wireless service provider, over a WiFi® or cellular network connection, or the like. Other devices are included as network-connected support devices, such as the remote system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, LLM components, or other components of the same device or another device connected via the network(s) 199, such as the ASR component 250, the LLM component 260, etc., of the remote system 120.

The concepts disclosed herein may be applied within a number of different devices and computer systems, including, for example, general-purpose computing systems, speech processing systems, and distributed computing environments.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3-6 orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
receiving an utterance from a first device;
converting the utterance into text;
determining a first constrained token list indicating tokens that can be included as a first element of a structured output;
processing, as a first pass through a decoder only large language model ("LLM"), the text with instructions to generate, for each of a plurality of tokens, a first probability score indicative of a first probability that the token is accurately selected by the decoder only LLM as the first element of the structured output;
constraining the plurality of tokens to only those tokens indicated on the first constrained token list;
determining, a first token from the first constrained token list having a highest first probability score;
determining that the highest first probability score exceeds a probability threshold;

in response to determining that the highest first probability score exceeds the probability threshold, including the first token as the first element of the structured output;
determining a second constrained token list indicating tokens that can be included as a second element of the structured output;
processing, as a second pass through the decoder only LLM, the text and the first token, with instructions to generate, for each of the plurality of tokens, a second probability score indicative of a second probability that the token is accurately selected by the decoder only LLM as the second element of the structured output;
constraining the plurality of tokens to only those tokens indicated on the second constrained token list;
determining, a second token from the first constrained token list having a highest second probability score;
determining that the highest second probability score does not exceed the probability threshold;
in response to determining that the highest second probability score does not exceed the probability threshold, sending a clarification request for a clarification response relating to second constrained token list;
receiving the clarification response;
processing, with the decoder only LLM, the clarification response, the text, and the first token to produce, for each of the plurality of tokens, an updated probability score indicative of an updated probability that the token is accurately selected by the decoder only LLM as the second element of the structured output;
determining a third token of the plurality of tokens having a highest updated probability score;
determining that the highest updated probability score exceeds the probability threshold;
in response to determining that the highest updated probability score exceeds the probability threshold, including the third token as a second output for the second element of the structured output; and
sending the structured output for execution.

2. The computer-implemented method of claim 1, wherein determining the second constrained token list further includes:
determining, based at least in part on the first token, the second constrained token list.

3. The computer-implemented method of claim 1, wherein the structured output includes a domain element as the first element, an Application Programming Interface ("API") call element as the second element, a device element as a third element, and a parameter element as a fourth element.

4. The computer-implemented method of claim 1, wherein each token of the first constrained set of tokens corresponds to an available domain of a plurality of domains that may be called in response to the utterance.

5. The computer-implemented method of claim 4, wherein each available domain is determined based at least in part on one or more of: a device that received the utterance, a user that generated the utterance, a first location of the device, or a second location of the user.

6. The computer-implemented method of claim 5, wherein each token of the second constrained token list corresponds to an Application Programming Interface ("API") call that corresponds to a domain represented by the first token.

7. A method, comprising:

determining, based at least in part on a source of an utterance, a first set of tokens to constrain a first large language model ("LLM") output;

processing, with the LLM, a first LLM input during a first pass through the LLM to generate the first LLM output that includes a first probability score for each of a plurality of tokens, the first probability score indicative of a probability that the token corresponds to a first element of a structured output;

constraining the first LLM output to the first set of tokens;

determining, from the first set of tokens and based at least in part on the first probability scores, a first token as the first element of the structured output;

appending, to the LLM input, the first token to generate a second LLM input;

determining, based at least in part on the first token, a second set of tokens to constrain a second LLM output;

processing, with the LLM, the second LLM input during a second pass through the LLM to generate the second LLM output that includes a second probability score for each of the plurality of tokens, the second probability score indicative of a second probability that the token corresponds to a second element of the structured output;

determining, from the second set of tokens and based at least in part on the second probability scores, a second token as the second element of the structured output;

generating the structured output to include the first token and the second token; and causing an execution of a command indicated by the structured output.

8. The method of claim 7, further comprising:

determining that a first probability score of the first token does not exceed a probability threshold;

in response to determining that the first probability score of the first token does not exceed the probability threshold, obtaining a clarification relating to the utterance;

processing, with the LLM, the first LLM input and the clarification to determine an updated probability score for the first token; and determining that the updated probability score exceeds the probability threshold; and wherein generating the structured output to include the first token is based at least in part on the updated probability score.

9. The method of claim 8, wherein obtaining the clarification relating to the utterance, further includes:

generating a request for clarification that indicates at least the first token and a request for a confirmation that the first token corresponds to an intent of the utterance, based at least in part on the first token;

presenting the request for clarification; and obtaining, in response to presenting, the clarification relating to the utterance.

10. The method of claim 7, wherein determining the first set of tokens, further includes:

determining at least one of a device that received the utterance, a user that generated the utterance, a first location of the device, or a second location of the user;

determining, based at least in part on the determined at least one of the device, the user, the first location, or the second location, at least one of a plurality of domains that may be called by the command determined by the LLM when processing the first LLM input; and selecting the first set of tokens as tokens corresponding to the at least one of the plurality of domains.

11. The method of claim 7, wherein determining the second set of tokens, further includes:

determining, based at least in part on a first domain represented by the first token, at least one of a plurality of Application Programming Interface ("API") calls that may be called for the first domain; and selecting the second set of tokens as tokens corresponding to the at least one of the plurality of API calls.

12. The method of claim 11, further comprising:

appending, to the second LLM input, the second token to generate a third LLM input;

determining, based at least in part on the second token, at least one of a plurality of devices that may execute an API call represented by the second token;

selecting a third set of tokens as tokens corresponding to the at least one of the plurality of devices;

processing, with the LLM, the third LLM input during a third pass through the LLM to generate a third LLM output that includes a third probability score indicative of a third probability that the token corresponds to a third element of the structured output; and generating the structured output that includes the first token, the second token, and a third token of the third set of tokens having a highest third probability score as determined based at least in part third probability scores determined by the LLM during the third pass through the LLM.

13. The method of claim 12, further comprising:

appending, to the third LLM input, the third token to generate a fourth LLM input;

determining, based at least in part on the third token, at least one of a plurality of parameters that may be executed by a device represented by the third token;

selecting a fourth set of tokens as tokens corresponding to the at least one of the plurality of parameters;

processing, with the LLM, the fourth LLM input to generate a fourth LLM output that includes a fourth probability score for each of the fourth set of tokens, the fourth probability score indicative of a fourth probability that the token corresponds to a parameter of the structured output; and generating the structured output that includes the first token, the second token, the third token, and a fourth token of the fourth set of tokens having a highest fourth probability score.

14. The method of claim 7, further comprising:

determining, for each token of the first set of tokens, a probability score indicative of a probability that the token is accurately determined by the LLM;

determining, based at least in part on at least some of the probability scores determined for tokens of the first set of tokens, a confidence score for the first token, the confidence score indicative of a confidence that that the first token is accurately determined by the LLM;

determining that the confidence score does not exceed a confidence threshold;

in response to determining that the confidence score does not exceed the confidence threshold, obtaining a clarification relating to the utterance;

processing, with the LLM, the first set of tokens and the clarification to determine updated probability scores for each token of the first set of tokens;

determining, based at least in part on at least some of the updated probability scores determined for tokens of the first set of tokens, an updated confidence score for the first token; and determining that the updated confidence score exceeds the confidence threshold; and wherein generating the structured output to include the first token is based at least in part on the updated confidence score.

15. The method of claim 7, further comprising:

generating a second plurality of tokens, each token corresponding to at least one of a domain, an Application Programming Interface ("API") call, a device, or a parameter; and tuning the LLM to include the second plurality of tokens in the plurality of tokens.

16. A system, comprising:

one or more processors; and a memory storing program instructions that, when executed by the one or more processors, further cause the one or more processors to at least:

process, with a large language model ("LLM"), a first LLM input that includes an utterance to produce a first LLM output;

constrain the first LLM output to only a first set of tokens;

determine that a probability score for a first token of the first set of tokens does not exceed a probability threshold, wherein the probability score is determined based at least in part on the first LLM output;

in response to determination that the probability score does not exceed the probability threshold, obtain a clarification with respect to the utterance;

process, with the LLM, the first LLM input and the clarification to produce a second LLM output;

constrain the second LLM output to the first set of tokens;

determine that an updated probability score for the first token of the first set of tokens determined based at least in part on the second LLM output exceeds the probability threshold;

in response to determination that the updated probability score exceeds the probability threshold, append, to the first LLM input, the first token to generate a second LLM input;

process, with the LLM, the second LLM input to produce a third LLM output;

constrain the third LLM output to only consider tokens of a second set of tokens that are different than the first set of tokens;

generate a structured output that includes the first token and a second token of the second set of tokens having a highest second probability score as determined based at least in part on the constrained third LLM output; and cause an execution of a command indicated by the structured output.

17. The system of claim 16, wherein the program instructions that, when executed by the one or more processors to generate the structured output, further include instructions that, when executed by the one or more processors, further cause the one or more processors to at least:

include the first token as a first element of the structured output; and include the second token as a second element of the structured output.

18. The system of claim 17, wherein:

the first token indicates a domain in which the command is to be executed; and the second token indicates an Application Programming Interface ("API") call.

19. The system of claim 16, wherein the program instructions that, when executed by the one or more processors, further cause the one or more processors to at least:

determine that the highest second probability score exceeds the probability threshold;

generate a confidence score for the second token, the confidence score indicative of a confidence that the second token is accurately determined;

determine that the confidence score does not exceed a confidence threshold;

in response to determination that the confidence score does not exceed the confidence threshold, obtain a second clarification relating to the utterance;

process, with the LLM, the third LLM input and the second clarification to determine updated second probability scores for each token of the second set of tokens;

determine, based at least in part on at least some of the updated second probability scores determined for tokens of the second set of tokens, an updated confidence score for the second token; and determine that the updated confidence score exceeds the confidence threshold; and wherein generation of the structured output to include the second token is based at least in part on the updated confidence score.

20. The system of claim 19, wherein the program instructions that, when executed by the one or more processors to obtain the clarification and the second clarification, further include instructions that, when executed by the one or more processors, further cause the one or more processors to at least:

include a first clarification request relating to the clarification and a second clarification request relating to the second clarification into a clarification request list; and prior to generation of the structured output, send a request for clarification that includes the first clarification request and the second clarification request.

* * * * *